(12) United States Patent
Walker et al.

(10) Patent No.: US 8,082,221 B2
(45) Date of Patent: Dec. 20, 2011

(54) CONDITIONAL PURCHASE OFFER MANAGEMENT SYSTEM

(75) Inventors: Jay S. Walker, Ridgefield, CT (US); T. Scott Case, Darien, CT (US); James A. Jorasch, Stamford, CT (US); Bruce Schneier, Minneapolis, MN (US)

(73) Assignee: Priceline.com Incorporated, Norwalk, CT (US)

( * ) Notice: Subject to any disclaimer, the term of this patent is extended or adjusted under 35 U.S.C. 154(b) by 1 day.

(21) Appl. No.: 12/572,993

(22) Filed: Oct. 2, 2009

(65) Prior Publication Data

US 2010/0023357 A1  Jan. 28, 2010

Related U.S. Application Data

(63) Continuation of application No. 09/443,158, filed on Nov. 18, 1999, now Pat. No. 7,620,619, which is a continuation of application No. 08/889,319, filed on Jul. 8, 1997, now Pat. No. 6,085,169, which is a continuation-in-part of application No. 08/707,660, filed on Sep. 4, 1996, now Pat. No. 5,794,207.

(51) Int. Cl.
*G06F 17/00* (2006.01)

(52) U.S. Cl. ............ 707/602; 707/756; 707/761; 705/1; 705/5; 705/6; 705/37

(58) Field of Classification Search ................. 707/602, 707/756, 761; 705/1, 5, 6, 37
See application file for complete search history.

(56) References Cited

U.S. PATENT DOCUMENTS 3,573,747 A  4/1971  Adams et al.
3,581,072 A  5/1971  Nymeyer
4,247,759 A  1/1981  Yuris et al.
4,449,186 A  5/1984  Kelly et al.
(Continued)

FOREIGN PATENT DOCUMENTS

EP  512702 A2  11/1992
(Continued)

OTHER PUBLICATIONS

LANCORP Mortgage Services, hup://www.lancorp-mortgage.com/retailpa.htm, 1998.
(Continued)

*Primary Examiner* — Sana Al-Hashemi
(74) *Attorney, Agent, or Firm* — Walter G. Hanchuk; Chadbourne & Parke LLP

(57) ABSTRACT

A conditional purchase offer (CPO) management system is disclosed for receiving CPOs from one or more customers, such as airline passengers, and for evaluating the received CPOs against a number of CPO rules defined by a plurality of sellers, such as airlines, to determine whether any seller is willing to accept a given CPO. A CPO is a binding offer containing one or more conditions submitted by a customer for purchase of an item, such as airline travel, at a customer-defined price. A CPO rule is a set of restrictions defined by a given seller, such as an airline, to define a combination of restrictions for which the seller is willing to accept a predefined price. The CPO rules may be securely stored by one or more servers. The CPO management system permits a seller to correct for forecasting errors, if necessary, or other competitive forces which have produced excess capacity, by providing inventory for sale to CPO customers.

20 Claims, 27 Drawing Sheets

U.S. PATENT DOCUMENTS

| | | | |
|---|---|---|---|
| 4,553,222 A | 11/1985 | Kurland et al. | |
| 4,677,552 A | 6/1987 | Sibley, Jr. | |
| 4,751,728 A | 6/1988 | Treat | |
| 4,789,928 A | 12/1988 | Fujisaki | |
| 4,799,156 A | 1/1989 | Shavit et al. | |
| 4,862,357 A | 8/1989 | Ahlstrom et al. | |
| 4,903,201 A | 2/1990 | Wagner | |
| 4,931,932 A | 6/1990 | Dalnekoff et al. | |
| 4,959,686 A | 9/1990 | Spallone et al. | |
| 5,021,953 A | 6/1991 | Webber et al. | |
| 5,101,353 A | 3/1992 | Lupien et al. | |
| 5,136,501 A | 8/1992 | Silverman et al. | |
| 5,168,446 A | 12/1992 | Wiseman | |
| 5,191,523 A | 3/1993 | Whitesage | |
| 5,191,613 A | 3/1993 | Graziano et al. | |
| 5,224,034 A | 6/1993 | Katz et al. | |
| 5,237,499 A | 8/1993 | Garback | |
| 5,243,515 A | 9/1993 | Lee | |
| 5,253,165 A | 10/1993 | Leiseca et al. | |
| 5,262,941 A | 11/1993 | Saladin et al. | |
| 5,283,731 A | 2/1994 | Lalonde et al. | |
| 5,297,031 A | 3/1994 | Gutterman et al. | |
| 5,329,589 A | 7/1994 | Fraser et al. | |
| 5,331,546 A | 7/1994 | Webber et al. | |
| 5,361,199 A | 11/1994 | Shoquist et al. | |
| 5,375,055 A | 12/1994 | Togher et al. | |
| 5,404,291 A | 4/1995 | Kerr et al. | |
| 5,420,914 A | 5/1995 | Blumhardt | |
| 5,426,281 A | 6/1995 | Abecassis | |
| 5,444,630 A | 8/1995 | Dlugos | |
| 5,467,269 A | 11/1995 | Flaten | |
| 5,500,793 A | 3/1996 | Deming, Jr. et al. | |
| 5,517,555 A | 5/1996 | Amadon et al. | |
| 5,519,769 A | 5/1996 | Weinberger et al. | |
| 5,553,131 A | 9/1996 | Minervino, Jr. et al. | |
| 5,557,517 A | 9/1996 | Daughterty, III | |
| 5,557,518 A | 9/1996 | Rosen | |
| 5,570,283 A | 10/1996 | Shoolery et al. | |
| 5,576,951 A | 11/1996 | Lockwood | |
| 5,592,375 A | 1/1997 | Salmon et al. | |
| 5,598,477 A | 1/1997 | Berson | |
| 5,606,602 A | 2/1997 | Johnson et al. | |
| 5,611,052 A | 3/1997 | Dykstra et al. | |
| 5,615,269 A | 3/1997 | Micali | |
| 5,640,390 A | 6/1997 | Sakamoto et al. | |
| 5,644,721 A | 7/1997 | Chung et al. | |
| 5,664,115 A | 9/1997 | Fraser | |
| 5,689,652 A | 11/1997 | Lupien et al. | |
| 5,694,551 A | 12/1997 | Doyle et al. | |
| 5,696,965 A | 12/1997 | Dedrick | |
| 5,715,399 A | 2/1998 | Bezos | |
| 5,715,402 A | 2/1998 | Popolo | |
| 5,717,989 A | 2/1998 | Tozzoli et al. | |
| 5,732,398 A | 3/1998 | Tagawa | |
| 5,732,400 A | 3/1998 | Mandler et al. | |
| 5,745,882 A | 4/1998 | Bixler et al. | |
| 5,757,917 A | 5/1998 | Rose et al. | |
| 5,758,328 A | 5/1998 | Giovannoli | |
| 5,774,883 A | 6/1998 | Andersen et al. | |
| 5,794,207 A | 8/1998 | Walker et al. | |
| 5,794,219 A | 8/1998 | Brown | |
| 5,797,127 A | 8/1998 | Walker et al. | |
| 5,799,285 A | 8/1998 | Klingman | |
| 5,809,478 A | 9/1998 | Greco et al. | |
| 5,822,737 A | 10/1998 | Ogram | |
| 5,826,244 A | 10/1998 | Huberman | |
| 5,832,452 A | 11/1998 | Schneider et al. | |
| 5,835,896 A * | 11/1998 | Fisher et al. | 705/37 |
| 5,845,265 A | 12/1998 | Woolston | |
| 5,878,403 A | 3/1999 | DeFrancesco et al. | |
| 5,890,138 A | 3/1999 | Godin et al. | |
| 5,905,975 A | 5/1999 | Ausubel | |
| 5,924,082 A | 7/1999 | Silverman et al. | |
| 6,012,045 A * | 1/2000 | Barzilai et al. | 705/37 |
| 6,026,383 A | 2/2000 | Ausubel | |
| 6,058,379 A * | 5/2000 | Odom et al. | 705/37 |
| 6,401,080 B1 * | 6/2002 | Bigus et al. | 705/37 |
| 6,408,283 B1 * | 6/2002 | Alaia et al. | 705/37 |
| 6,606,607 B1 * | 8/2003 | Martin et al. | 705/37 |
| 6,839,479 B2 | 1/2005 | Berger et al. | |

FOREIGN PATENT DOCUMENTS

| | | |
|---|---|---|
| WO | 95/16971 | 6/1995 |
| WO | 96/13013 | 5/1996 |
| WO | 96/34356 | 10/1996 |
| WO | 97/16797 | 5/1997 |
| WO | 97/46961 | 12/1997 |
| WO | 98/10361 | 3/1998 |

OTHER PUBLICATIONS

Inland Mortgage Corporation, http://inlandmortgage.com/index.htm, 1998.

The Mortgage Store, http://www.mortgagestore.com, 1998.

Golden Age Antiques and Collectibles Online Auction, http://www.goldage.com, 1997.

Moran, Susan, "Xerox Won't Duplicate Past Errors", Business Week, Sep. 29, 1997.

Coleman, Zach, "Electronic Trading System Matches Buyers, Seller", Atlanta Business Chronicle, vol. 20; No. 12; p. 37A, Aug. 22, 1997.

Resnick, Paul et al, "Roles for Electronic Brokers", http://ccs.mit.edu/CCSWP179.htm 1997.

Philatelists Online Information, http://www506.bonsai.com/q/@1313541hyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Trade-direct, http://www.trade-direct.com. 1997.

"Internet Mortgage Service Eliminates Loan Agents and Passes Commissions on to the Consumer", Yahoo! Finance, 1997.

Negroponte, Nicholas, "Pay Whom Per What When, Part 2", NEGROPONTE, Issue 5.03, 1997.

"Ticketing revolution Could Triple Airline Profits, Analyst Says", Aviation Daily, vol. 325; No. 11; p. 87, 1996.

"Auctioning Unsold Airline Tickets", adapted extract from Insight (USA), The Global Ideas Bank, 1996.

Rockoff, Todd E., et al., "Design of an Internet-based system for remote Dutch auctions," Internet Research: Electronic Networking Applications and Policy, vol. 5, No. 4, pp. 10-16, 1995.

Franklin, Matthew K., et al., "The Design and Implementation of a Secure Auction Service," Proceedings: 1995 IEEE Symposium on Security and Privacy, pp. 2-14, 1995.

Tenenbaum, Jay M., et al.,"CommerceNet: Spontaneous Electronic Commerce on the Internet," 1995 IEEE Spring Conference, pp. 38-43.

Sirbu, Marvin and Tygar, J.D., "NetBill: An Internet Commerce System Optimized for Network Delivered Services," IEEE 1995 Spring Conference, pp. 20-25.

Bunker, Ted, "How Auction Technology Sped and Enhanced Sale of Radio Licenses," Investor's Business Daily, Executive Update, Regulation, p. A3, Feb. 24, 1995.

"AUCNET: The Story Continues", Harvard Business School, Jan. 17, 1995.

Anand, R., and Rao, M. Padmaja, "The Electronic Flea Market", IBM Research Division: Research Report, pp. 1-18, Jul. 28, 1994.

"Unusual Farmland Auction Set," Harrison Scott Publications, Liquidation Alert, Mar. 28, 1994.

"The Computer Museum brings auction block to cyberspace in First Internet Auction," Business Wire, Mar. 14, 1994.

Freeman, Brian and Gideon, Lidor, "Hosting Services—Linking the Information Warehouse to the Information Consumer," IEEE 1994 Spring Conference, pp. 165-171.

Booker, Ellis, "Mega real estate auction counts on imaging," Computerworld, p. 20, Dec. 7, 1992.

Abstract: "A forward/reverse auction algorithm for asymmetric assignment problems," Computational Optimization and Applications, Dec. 1992.

Abstract: "Marketel Shuts Doors," Travel Agent Magazine, Mar. 23, 1992.

Cass, Maxine, "West Coast Agents Remain Skeptical About New Air Ticket Sales Plan; Marketel: Airline ticket sales system sparks concern," Travel Agent Magazine, p. 50, Sep. 2, 1991.

Bookit!, "Airline Ticket Purchase Order For Business & Leisure Travel", Marketel International, Inc., 1991.

Inhaber, Herbert, "How To Solve the Problem of Siting Nuclear Waste," Transactions of the American Nuclear Society, vol. 62, Nov. 11-15, 1990.

Dyson, Esther, "Information, Bid and Asked," Forbes, Aug. 20, 1990.

"Mercado electronico, El chance de regatear por computador", CIENCIA Technologia E Informatica, Mar. 21, 1990 (Translation enclosed).

Cole, Jeff, "Fare bidding plan could be the ticket", St. Paul Pioneer Press Dispatch, Mar. 11, 1990.

Miller; Ross M., "The Design of Decentralized Auction Mechanisms that Coordinate Continuous Trade in Synthetic Securities," Journal of Economic Dynamics and Control, pp. 237-253, 1990.

"Business Briefing, Airline Seats May Go on the Auction Block", Insight on the news, Dec. 4, 1989.

"Business Travel Update, Automation", Travel Weekly, Nov. 27, 1989.

Munro, Don and McCann, David, "A New Way to Purchase Travel, Automated Service Would Let Companies Bid for Already-Filled Airline Seats", Business Travel News, Nov. 6, 1989.

"An Electronic Auction Ahead For Airline CRS's?", The Business Week Newsletter for Information Executives, Oct. 27, 1989.

Cohen, Danny, "Electronic Commerce," ISI Research Report, University of Southern California, Oct. 1989.

"From Airline Tickets to Human organs, the Electronic Markets are Booming", Times, vol. 3, No. 50, Aug. 14, 1989.

Coyne, Andrew, "Unbundling ideas may alter world of politics," The Financial Post (Toronto), Section 1, p. 11, Sep. 27, 1989.

Malone, Thomas W., et al., "Electronic Markets and Electronic Hierarchies," Communications of the ACM, vol. 30, No. 6, Jun. 1987.

"Aucnet: TV Auction Network System," Harvard Business School, Jul. 19, 1989.

Sammer, Harald W., "Online Stock Trading Systems: Study of an Application," IEEE 1987 Spring Conference, pp. 161-162.

Littlefair, T., "Homelink: A unique service," Computer Bulletin, pp. 12-14, Jun. 1986.

Banatre, Jean-Pierre, et al., "The Design and Building of Echere, a Distributed Electronic Marketing System," Communications of ACM, vol. 29, No. 1, Jan. 1986.

Turoff, Murray and Chinai, Sanjit, "An Electronic Information Marketplace," Elsevier Science Publishers B.V., pp. 79-90, 1985.

Banatre, Michel, "Distributed auction bidding system," IPC Business Press, Computer Communications, vol. 4, No. 4, Aug. 1981.

Koepper, Ken, "Room Inventory Auctioning: The Next CRS Generation," Lodging, Jan. 1990 at p. 26, 29-30.

Fishkin, Ken, Foresight Exchange Tutorial: (http://www.ideosphere.com/fx/docs/tutorial.html) Feb. 19, 1999 at pp. 1-5.

"Bid.com 1998 Third-Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/VirtualH/virtualh02.html), download date: Sep. 20, 1998.

"First Source Become a Member", More Reasons To Join First Source! (http://www.fsource.com/bene.html), download date: Sep. 20, 1998.

Jeffrey Davis, "Big Storm rising", Business 2.0, Sep. 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred 'bidder Harvest, Sep. 1997, p. 58.

NASDAQ: What is NASDAQ?, selected pp. downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

The Loan Process, downloaded form www.sdtech.com/mls/process on Aug. 7, 1997.

Trade-Direct: We Help You Trade With Confidence, selected pages downloaded from www.tradedirect.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicom.com.fr/airhitch on May 6, 1997.

Hitch a Flight to Europe, selected pp. downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, $4^{th}$ ACM Conference on Computer and Communications Security, ACM Press, 117-124 (Apr. 1997).

Bryant, Adam, "Shaking Up Air Fares' Status Quo", The New York Times, Mar. 31, 1997.

Silverman, Robert, "GM Drives Web Ad Insertion Network", Inside Media, Feb. 26, 1997, vol. 9, No. 4, p. 1; ISSN:1046-5316.

"Flycast Introduces Unique 'Open Exchange' Match-Making Service", Interactive Marketing News, Feb. 21, 1997, vol. 4, No. 8.

"UK's" World Telecom Unveils New WorldSaver Tariffs, Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real-Time Travel Auction Service to Be Available Via World Wide Web: ETA To Open Bidding to Consumers," Business Wire, Dialog Trade & Industry Database (Nov. 4, 1996).

Gessel, Chris, "Trade Smarter: The Limit of Orders", Investor's Business Daily, Oct. 14, 1996, p. A1.

CREST: Cruise/Ferry Revenue Management System, selected pages downloaded from www.rtscorp.com on Aug. 5, 1996.

Nishimoto, Lisa, "Travel Services Are First Online.Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Sothbey's General Information, downloaded from www.sothebys.com (1996).

CyberBid, Net Fun Ltd.(1996).

Nimmer, Raymond, T., "Electronic Contracting; Legal Issues", 14 J. Marshall J.Computer & Info L.211, Winter, 1996.

American Law Institute, Draft-Uniform Commercial Code Revised Article 2 (Sales), parts 2, 3, and 7, pp. 1-5, Jan. 4, 1996.

Speidel, Richard E. & Schott, Lee A., "Impact of Electronic Contracting on Contract Formation Under Revised UCC Article 2, Sales",C878 ALI-ABA 335, Dec. 9, 1993.

Hainer, Cathy and Grossman,Cathy Lynn, "Where Vacationing Kids Get Good Care", USA Today, Apr. 1,1992, at p. 4D.

Del Rosso, Laura, "Ticket-Bidding Firm Closes Its Door," Travel Weekly, Mar. 12, 1992.

"Newsletters", The Atlanta Constitution, Mar. 1, 1992, p. K13.

"CRTL's Blue Ribbon Deals for 1992", Consumer Reports Travel Letter, Jan. 1992, vol. 8, No. 1, at pp. 3-5.
Traveler's Notes; Bookit Report, Consumer Reports Travel Letter, Dec. 1991 at p. 143.
Feldman, Joan M., "To Rein in Those CRSs; Computer Reservation Systems", Air Transport World, Dec. 1991, at p. 89.
"MONEY BRIEFS; Buy Low, Fly High", Gannet News Service, Nov. 20, 1991.
"Buy Low, Fly High", USA Today, Nov. 14, 1991 at p. 15.
Traveler's Notes; Easier Airfare Bidding, Consumer Reports Travel Letter, Oct. 1991 at p. 119.
Nelson, Janet "Practical Traveler; Airlines Relaxing Policy on No-Refund Tickets", The New York Times, Sep. 22, 1991 at p. 3 of Section 5.
Pelline, Jeff, "NeW Service; Now You Can Make a Bid on Your Next Airline Ticket Home", The Orange County Register, Sep. 1, 1991 at p. E01.
"Bookit Airfare Bidding System (Fax for Your Plane Ticket?)", Consumer Reports Travel Letter, Sep. 1991, pp. 97 & 106.
Upton, Kim "French Say Monoliths Off-limits to Visitors", Los Angeles Times, Aug. 25, 1991.
Pelline, Jeff, "Travelers Bidding on Airline Tickets; Sf Firm Offers Chance for Cut-Rate Fares". San Francisco Chronicle, Section A4, Aug. 19, 1991.
Carey, Christopher, "Firm Offers Auction for Airline Tickets", St. Louis Post-Dispatch, Aug. 7, 1991 at p. 1B.
Del Rosso, Laura, "Marketel Says It Plans to Launch Air Fare 'Auction' in Jun.", Travel Weekly, Apr. 29, 1991.
NASDAQ Adds Enhancements to SOES Limit Order File, Securities Week, Nov. 26, 1990, p. 5.
Ritter, Jeffrey B., "Scope of the Uniform Commercial Code: Computer Contracting Cases and Electrical Commercial Practices", 45 Bus. Law 2533, Aug. 1990.
Greenberg, Peter, S., "Judging DeRegulation", The Record, Jul. 22, 1990 at p. T01.
Greenberg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.
Wallace, David, "Company Planning to Let Fliers Bid on Airfares", Philadelphia Business Journal, Mar. 26, 1990 at p. 15.
"Letters to Business Extra", The San Francisco Chronicle, Dec. 26, 1989 at p. C7.
Schrage, Michael, "An Experiment in Economic Theory; Labs Testing Real Markets", The Record Section B 1, Nov. 26, 1989.
Schrage, Michael Innovation/Micheal Schrage: Laboratory Experiments with Market Economics, Los Angeles Times, Nov. 23, 1989 at p. D1.
Golden, Fran "AAL's Riga Doubts Marketel's Appeal to Retailers", Travel Weekly, Nov. 13, 1989.
Del Rosso, Laura, Firm Proposes ticket-bidding system; Marketel explores electronic auction of travel; Marketel International., Travel Weekly, Section No. 91, vol. 48, p. 1; Nov. 13, 1989.
Carlsen, Clifford, "Polaris Group Set to Fly the Leveraged Sky", San Francisco Business Times, Nov. 6, 1989 at p. 1.
Kuttner, Robert, "Computers May Turn the World into One Big Commodities Pit", Business Week, Sep. 11, 1989.
Carlsen, Clifford, "From Airline Tickets to Human Organs, the Electronic Markets Are Booming", San Francisco Business Times, Aug. 14, 1989 at p. 17.
"Public May Submit Bids to Get Bargain Rates", Wall Street Journal, Section 2; p. 1, col. 1; Aug. 1, 1989.
Hensley, H.G., "I'll Take Juarez," Travel weekly, vol. 45, p. 7, Feb. 1986.
Gibson, R., et al, "Marketing: Fast-Food Chains Hope Diners Swallow New 'Value' Menu of Higher-Priced Items," The Wall Street Journal, Mar. 13, 1992, p. B1.
Anonymous, "Another Reason to Love Those Affluent Customers," Jeweler's Circular-keystone, vol. CLXX, No. 7, p. 64, Jul. 1999.
Peter S. Greenberg, "Lower Air fares for Consumers Not in the Cards Airlines: Remember when it cost $16 to fly from Los Angeles to San Francisco"? The Los Angeles Times (Pre-1997 Fulltext). Los Angeles, CA Jul. 8, 1990, p. 2.
PCT Search Report, International app No. PCT/US00/04064, mailed Jan. 2, 2001.
EP Search Report, Ref. MNM/P21628 EP, Application No. EP97940780.6-2201-US9715492, dated Jun. 14, 2000.
Koepper, K., "Room Inventory Auctioning: the Next CRS Generation," Lodging, Jan. 1990, p. 26.
Elliott, E.X., "CRSS in Cyberspace," Travel Agent, v 280, n. 10, May 6, 1996, p. 50.
Boisseau, C., "Netting cheap fares/Some are taking cyberspace route," Houston Chronicle, Aug. 16, 1996, p. 1.
"Cathay Pacific Airways auctions a Boeing 747-400 worth of seats in third Cubertraveler Auction; 'Bid Now, Fly Later' in Online Ticket Auction," Business Wire, Apr. 29, 1996.
American Airlines Internet Silent Auction, selected pages downloaded from www.americanair.com, released Aug. 8, 1996.
Apollo Host Computer, selected pages downloaded from www.appollo.com, after 1995; date unknown.
"Auctioning unsold airline tickets," http://www.newciy.org/GIB/BOV/BV-409.HTML , at p. 1, printed Oct. 29, 1996 and Sep. 28, 1999.
Cathay Pacific: CyberTraveler Auction #3—Official Rules, selected pages downloaded from www.cathaypacific.com, updated Jul. 30, 1996.
CSM Online: About Collector's Super Mall downloaded from www.csmonline.com, printed Apr. 23, 1998.
Sabre Decision Technologies, selected pages downloaded from www.sabre.com, date unknown.
PhoneMiser: Frequently Asked Questions, downloaded from www.phonemiser.com, printed Jul. 14, 1996.
The United Computer Exchange: How It All Works, selected pages downloaded from www.uce.com, printed Apr. 10, 1998. .
"Tired of Shopping for the Best Home Loan?," Mortgage Loan Specialists, faxed Aug. 7, 1997.
"What's Holding Up E-Cash?," Cybernautics Digest, col. 3; No. 7, Finance, printed Sep. 8, 1997.
International Search Report corresponding to PCT/US97/15492 mailed Feb. 10, 1998.

* cited by examiner

CUSTOMER DATABASE 600

| NAME 640 | ADDRESS 645 | CREDIT CARD NUMBER 655 | ID NUMBER 660 |
|---|---|---|---|
| GIACOMO SORENTINO | 23 MAIN ST., BRIDGEPORT, CT | 2222-3333-4444-5555 | 234546 |
| BOBBY VALENTINO | 43 PARK ST., HARTFORD, CT | 9999-8888-7777-6666 | 65432 |
| JOE SMITH | 102 PINE ST. WATERBURY, CT | 6767-9898-0101-2323 | 98765 |

AIRLINE DATABASE 700

| AIRLINE NAME 740 | ADDRESS 745 | CONTACT 750 | PUBLIC KEY 755 | CPO ACCEPTANCE RATE 760 |
|---|---|---|---|---|
| AMERICAN | 25 MAIN STREEET, CHICAGO, IL | SUE JOHNSON | 12347AD73E | 37% |
| DELTA | 102 45TH ST. NEW YORK, NY | BILL JOHNSON | 35627A7C9 | 46% |
| UNITED | 9492 6TH AVE. NEW YORK, NY | JOHN WILLIAMSON | 1829CB612 | 4% |

FLIGHT SCHEDULE DATABASE 800

| ORIGINATING AIRPORT 840 | DESTINATION AIRPORT 845 | DATE 850 | TIME OF DEPARTURE 855 | TIME OF ARRIVAL 860 | AIRLINE 865 | FLIGHT NUMBER 870 | VIA 875 |
|---|---|---|---|---|---|---|---|
| NASHVILLE, TN (BNA) | LOS ANGELES, CA (LAX) | 12/12/96 | 12:00PM | 6:00PM | AMERICAN | 1870 | NON-STOP |
| NEW YORK CITY (JFK) | LOS ANGELES, CA (LAX) | 01/01/97 | 7:00AM | 3:04PM | AMERICAN | 226 | CHICAGO |
| NEW YORK CITY (JFK) | SAN FRANCISCO, CA (SFO) | 03/03/97 | 3:00PM | 7:10PM | UNITED | 300 | NON-STOP |

| CPO NUMBER 920 | DATE 925 | TRAVEL AGENT NUMBER 930 | PRIMARY PASSENGER NAME 935 | CUSTOMER ID 940 | COMPANION PASSENGERS 945 | ORIGINATING CITY 950 | DESTINATION CITY 955 | CONNECTION RESTRICTIONS 960 |
|---|---|---|---|---|---|---|---|---|
| 23456 | 4/20/97 | 4321 | JOHN DOE | 12345 | MRS. JOHN DOE, JOHN DOE JR. | NEW YORK, NY (JFK) | LOS ANGELES, CA (LAX) | LEAVE SATURDAY |
| 23457 | 4/21/97 | 2648 | JAMES SMITH | 45231 | ANN SMITH | NEW YORK, NY (JFK) | CHICAGO, IL (MDW/ORD) | ONE STOP |
| 23457 | 4/21/97 | 2648 | JAMES SMITH | 45231 | ANN SMITH | NEW YORK, NY (JFK) | CHICAGO, IL (MDW/ORD) | ONE STOP |

CPO DATABASE 900

FIG. 9a

| DATES OF DEPARTURE 965 | DATES OF RETURN 970 | NUMBER OF PASSENGERS TRAVELING 975 | PRICE PER TICKET 980 | OTHER RESTRICTIONS 985 | STATUS 990 | PASSENGER NAME RECORD NUMBER 995 |
|---|---|---|---|---|---|---|
| 4/12/97- 4/14/97 | 4/29/97- 4/30/97 | 3 | $547.01 | | ACCEPTED | 33333 |
| 4/22/97 | 4/30/97 | 2 | $188.00 | N/A | PENDING | |
| 4/22/97 | 4/30/97 | 2 | $200.00 | N/A | PENDING | |

CPO DATABASE

SECURED AIRLINE RULES DATABASE 1000

| RULE NUMBER 1010 | ORIGINATING CITY 1012 | DESTINATION CITY 1014 | CONNECTION RESTRICTIONS 1016 | FLIGHT NUMBERS 1018 | DATE(S) OF DEPARTURE 1020 | TIME(S) OF DEPARTURE 1022 | DEPARTURE DAY OF WEEK 1024 |
|---|---|---|---|---|---|---|---|
| 45685 | NEWARK, NJ (EWR) | ORLANDO, FL (MCO) | N/A | N/A | 10/1/97- 10/31/97 | N/A | TUES.- THURS. |
| 45687 | NEW YORK, NY (JFK) | CHICAGO, IL (ORD) | THRU CLEVELAND OR PITTSBURG | N/A | 4/1/97- 5/31/97 | 11AM-2PM | TUES. |

| DATE(S) OF RETURN 1026 | TIMES OF RETURN 1030 | RETURN DAY OF WEEK 1032 | NUMBER OF PASSENGERS TRAVELING 1034 | LENGTH OF HAUL 1036 | YIELD ($1/MILE) 1038 | MINIMUM PRICE 1040 | INVENTORY RESTRICTIONS OR AVAILABILITY 1042 | ADVANCE PURCHASE REQUIREMENTS 1044 |
|---|---|---|---|---|---|---|---|---|
| 10/1/97- 10/31/97 | N/A | TUES.- THURS. | AT LEAST 2 | N/A | N/A | $165.00 | K INVENTORY ONLY | WITHIN 21 DAYS OF FLIGHT |
| 4/1/97- 5/31/97 | 11AM-2PM | MON.- THURS. | 2 | N/A | N/A | $150.00 | Q OR K INVENTORY ONLY | 7-21 DAYS PRIOR TO FLIGHT |

SECURED AIRLINES RULES
DATABASE- INVENTORY 1050

| RULE NUMBER 1060 | AIRLINE 1062 | FLIGHT NO. 1064 | DATE(S) 1066 | NUMBER OF SEATS AVAILABLE 1068 |
|---|---|---|---|---|
| 2345566 | AMERICAN | 249X | 4/29/97 | 14 |
| 2345567 | AMERICAN | 1209 | 5/1/97 | 25 |
| 2345678 | AMERICAN | 808 | 5/1/97 | 7 |

1052 — first row
1054 — second row
1056 — third row

FIG. 10b

SECURED AIRLINES RULES
DATABASE- PRICING
1075

| AIRLINE 1088 | ORIGINATING CITY 1090 | DESTINATION CITY 1092 | DATE(S) 1093 | MINIMUM PRICE 1096 |
|---|---|---|---|---|
| AMERICAN | CLEVELAND, OH (CLE) | NEW YORK, NY (JFK) | 5/2/97-5/13/97 | $75 |
| AMERICAN | CLEVELAND, OH (CLE) | LOS ANGELES, CA (LAX) | 5/1/97-5/13/97 | $260 |
| AMERICAN | NEW YORK, NY (JFK) | CHICAGO, IL (ORD) | 5/1/97-5/31/97 | $182 |

COUNTER OFFER RULES DATABASE 1100

| RULE NUMBER | DATE(S) OF DEPARTURE | TIME(S) OF DEPARTURE | DATE(S) OF RETURN | TIME(S) OF RETURN | ... | NUMBER OF PASSENGERS TRAVELLING | LENGTH OF HAUL | YIELD | MINIMUM PRICE | ADVANCE PURCHASE REQUIREMENTS |
|---|---|---|---|---|---|---|---|---|---|---|
| 45687 | WITHIN 1 DAY | WITHIN 2 HOURS | WITHIN 1 DAY | WITHIN 2 HOURS | | AT LEAST 2 | N/A | N/A | WITHIN 10% | WITHIN 2 DAYS |

SECURED AIRLINE AUDIT DATABASE 1200

| CPO NUMBER 1220 | ANSWER RESPONSE 1225 | DATE 1230 | TIME 1235 | PASSENGER NAME RECORD NUMBER 1235 | TICKET BOOKED 1235 |
|---|---|---|---|---|---|
| 2345 | YES | 4/5/97 | 3:40PM | 56789 | ANOTHER AIRLINE |
| 2346 | NO | 4/6/97 | 2:00PM | 98765 | NO TICKET BOOKED |
| 2347 | YES | 4/8/97 | 12:00PM | 34567 | THIS AIRLINE |

| FLIGHT | DATE | INVENTORY K PRICE | INVENTORY K RESTRICTION | INVENTORY Y PRICE | INVENTORY Y RESTRICTION |
|---|---|---|---|---|---|
| AL654 | 4/16/97 | $50.00 | 7 DAY RETURN | $40.00 | RETURN FRIDAY |
| DB120 | 5/12/97 | $75.00 | RETURN FRIDAY | $60.00 | ONE STOP |
| 124C | 6/3/97 | $25.00 | ONE STOP | $20.00 | 7 DAY RETURN |

PRICING AND RESTRICTIONS DATABASE 1300

| FLIGHT NUMBER | DEPARTURE DATE | INVENTORY K SEATS AVAILABLE | INVENTORY Y SEATS AVAILABLE | TOTAL SEATS BOOKED | TOTAL CAPACITY |
|---|---|---|---|---|---|
| | | | | _1045_ | |
| 12345 | 5/15/97 | 42 | 114 | 144 | 300 |
| 23456 | 5/15/97 | 36 | 200 | 64 | 300 |
| 34567 | 5/15/97 | 58 | 97 | 145 | 300 |
| 45678 | 5/15/97 | 27 | 212 | 61 | 300 |

SEAT ALLOCATION DATABASE 1400

FORECAST AND DEMAND ANALYSIS DATABASE 1500

| FLIGHT NUMBER 1530 | DEPARTURE DATE 1535 | ORIGINATING CITY 1540 | DESTINATION CITY 1545 | OFFERED PRICE 1550 | FARE CLASS 1555 | ACTUAL QUANTITY SOLD 1560 | FORCASTED QUANTITY |
|---|---|---|---|---|---|---|---|
| 1234 | 3/3/97 | NEW YORK (JFK) | LOS ANGELES (LAX) | $349 | Y | 70 | 300 |
| 1234 | 3/3/97 | NEW YORK (JFK) | LOS ANGELES (LAX) | $339 | Y | 100 | 130 |
| 1234 | 3/3/97 | NEW YORK (JFK) | LOS ANGELES (LAX) | $329 | Y | 130 | 140 |
| 1234 | 3/3/97 | NEW YORK (JFK) | LOS ANGELES (LAX) | $409 | K | 7 | 20 |
| 1234 | 3/3/97 | NEW YORK (JFK) | LOS ANGELES (LAX) | $399 | K | 40 | 60 |

CONDITIONAL PURCHASE OFFER MANAGEMENT SYSTEM

CROSS-REFERENCE TO RELATED APPLICATIONS

This application is a continuation of, and claims priority to, pending U.S. patent application Ser. No. 09/443,158, entitled "CONDITIONAL PURCHASE OFFER MANAGEMENT SYSTEM", filed on Nov. 18, 1999, which in turn is a continuation of, and claims priority to, U.S. patent application Ser. No. 08/889,319, entitled "CONDITIONAL PURCHASE OFFER MANAGEMENT SYSTEM", filed on Jul. 8, 1997, and issued as U.S. Pat. No. 6,085,169 on Jul. 4, 2000, which in turn is a continuation-in-part of, and claims priority to, U.S. patent application Ser. No. 08/707,660, entitled "METHOD AND APPARATUS FOR A CRYPTOGRAPHICALLY ASSISTED COMMERCIAL NETWORK SYSTEM DESIGNED TO FACILITATE BUYER-DRIVEN CONDITIONAL PURCHASE OFFERS", filed on Sep. 4, 1996, and issued as U.S. Pat. No. 5,794,207 on Aug. 11, 1998. These three applications are incorporated herein in their entirety by reference.

FIELD OF THE INVENTION

The present invention relates generally to a system for selling goods and services, such as airline tickets and, more particularly, to a method and system for managing the sale of such goods and services by a seller, such as an airline, to customers who have submitted an offer for the purchase of such items.

BACKGROUND OF THE INVENTION

Airlines and other sellers have developed sophisticated revenue management systems (RMSs) to optimize revenue. Generally, when a flight is first added to an airline's flight schedule, the airline's revenue management system attempts to maximize revenue for the flight by establishing a plurality of fare classes and then allocating the number of seats and price assigned to each fare class. The revenue management system will thereafter continue to monitor the actual demand within each fare class relative to forecasted demand, to dynamically reevaluate the inventory allocation and pricing of each fare class for a given flight. In this manner, the airlines attempt to fly each aircraft as full as possible without allowing earlier-booking discount-fare passengers to displace later-booking full-fare passengers.

While conventional revenue management systems employ sophisticated tools to anticipate future travel, forecasting errors invariably lead to unanticipated excess capacity. In addition, an airline can utilize its revenue management system to forecast its anticipated excess capacity on a given flight associated with seats that are predicted to be empty. Furthermore, unexpected external events, such as a price war or extreme weather conditions, can also affect an airline's excess capacity. Thus, in an attempt to reduce such excess capacity, airlines periodically reevaluate the inventory allocation and pricing of each fare class for a given flight. An airline cannot simply discount the published fares for such unsold seats, however, without either starting a fare war or compromising its own underlying fare structure (i.e., without also reducing its full-fare prices for business travelers). Thus, there is currently no effective way for airlines to dispose of such excess capacity.

Although many airlines fill empty seats with "standby" passengers, this practice is typically limited to instances where some oversight on the part of either the passenger or the airline has occurred. For example, the passenger's flight may have been overbooked, the passenger may have missed an original flight, or the passenger may have purchased a ticket at or near the time of the flight. Moreover, standby travel is costly for the airline and is inconvenient for the passenger because there is no guarantee that the passenger will get to fly on the same day.

In addition, airlines attempt to sell excess capacity utilizing consolidators, who traditionally sell airline tickets at a discount. Since the terms of the relationship between the airlines and the consolidators are generally not flight specific and are typically defined months in advance, the sale of tickets through a consolidator does not provide a sufficiently dynamic mechanism for airlines to sell such excess capacity when actual demand fails to meet forecasted demand. Even assuming that the airlines could release the tickets for sale through the consolidators at the last minute, there is currently no effective way for the consolidators to announce the availability and price of such tickets to customers.

Airlines recognize that there is a large source of latent demand associated with leisure travelers who are willing to purchase tickets at a favorable price. There is currently no effective way, however, for an airline to receive an offer from a customer for leisure travel at a particular price set by the customer, below the airline's published fare. In particular, there is no effective way for the airline to be confident that if the airline accepts the customer's offer, the customer will book the ticket without using the information to ascertain the airline's underlying level of price flexibility, which, if known to an airline's competitors or customers, could dramatically impact the airline's overall revenue structure.

As apparent from the above deficiencies with conventional systems for selling goods and services, such as airline tickets, a need exists for a system that permits a seller to sell excess capacity when actual demand fails to meet forecasted demand. A further need exists for a buyer-driven system that permits an airline to sell tickets to leisure travelers at a price set by the customer, typically below the airline's published fare. Yet another need exists for a system that permits sellers to stimulate sales of excess inventory, without compromising the seller's published price structure. Another need exists for a system that permits sellers to capture and process consumer demand for each selling price of a given item, such as a given fare class on each airline flight.

SUMMARY OF THE INVENTION

Generally, according to one aspect of the invention, a conditional purchase offer (CPO) management system is disclosed for receiving conditional purchase offers from one or more customers, such as airline passengers, and for evaluating the received CPOs against a number of CPO rules defined by a plurality of sellers, such as airlines, to determine whether any seller is willing to accept a given CPO. A CPO is a binding offer containing one or more conditions submitted by a customer for purchase of an item, such as airline travel, at a customer-defined price.

A CPO rule is a set of restrictions defined by a given seller, such as an airline, to define a combination of restrictions for which the seller is willing to accept a predefined minimum price. The CPO rules are utilized by the CPO management system to render a decision to either accept, reject or counter a CPO on behalf of a particular seller.

In an illustrative airline embodiment, the CPO rules are preferably generated by the revenue management system (RMS) of the respective airline by evaluating current inventory, pricing and revenue information, as well as historical patterns, to forecast future travel. In alternate embodiments, the CPO rules may be generated by a yield management system, a profit management system, or any system which controls and manages inventory. The RMS may be embodied as a conventional RMS, as modified herein to generate CPO rules and to otherwise allocate and price airline tickets for sale to CPO customers. In one preferred embodiment, the RMS will periodically execute a CPO rule generation process to generate CPO rules that encourage the sale of tickets to CPO customers.

The CPO management system preferably includes a CPO management central server and one or more secured airline servers. Each secured airline server may be associated with one or more airlines and each server stores, among other things, the CPO rules defined by any associated airlines. Each secured airline server may be remotely located from the CPO management central server, or may be integrated with the CPO management central server. In one remote embodiment, the secured airline server associated with one or more airlines may be physically located at a processing facility secured by the particular airline.

The CPO rules contain sensitive information, including price flexibility and available capacity, which, if known to an airline's competitors or customers, could dramatically impact the airline's overall revenue structure. Thus, according to a feature of the present invention, the CPO rules may be securely stored by each airline server, to prevent one airline from accessing, obtaining or altering the CPO rules of another airline. In one embodiment, the secured airline servers utilize encryption techniques and database access control mechanisms.

According to a further aspect of the invention, the CPO management system prevents customers from submitting multiple CPOs containing a progressively increasing price in order to identify the airline's defined minimum price for a given flight. For example, if a CPO will be binding upon the customer if accepted by any airline, the customer will be discouraged from "pinging" the CPO management system to identify the airline's underlying price flexibility. In addition, the CPO management system can limit the number of CPOs which any customer can submit within a predefined time period. In alternate embodiments, the customer or travel agent can be charged a fee or a penalty if a ticket is not booked when at least one airline has accepted the CPO or the CPO management system can evaluate a rating of the customer containing information regarding the likelihood that said customer will book a ticket corresponding to said CPO. In this manner, the airline can be confident that if the airline accepts the customer's offer, the customer will book the ticket without using the information to ascertain the airline's underlying level of price flexibility.

Customers may contact the CPO management system by means of telephone, facsimile, online access, e-mail, in-person contact or through a travel agent, to provide the CPO management system with the terms of their CPO. In one preferred embodiment, the customer 110 may contact the CPO management system 100 by means of a telephone, with the CPO management system 100 collecting information from the customer 110 related to the CPO using an interactive voice response unit (IVRU) (not shown). Once the terms of the CPO have been received by the CPO management system, the CPO management central server will execute a CPO management process to compare the received CPO against the CPO rules of each airline, to determine whether to accept, reject or counter the CPO. Thereafter, the customer is notified of the response of the airlines to the CPO. If an airline accepts the CPO, or if the customer accepts a counteroffer from an airline, a ticket is then booked by the CPO management system with the appropriate restrictions.

The CPO management system may optionally access a central reservation system (CRS) or proprietary airline reservation systems (ARSs) of each airline, to perform itinerary queries that will identify particular flights which satisfy a given itinerary, and to make reservations.

According to a further aspect of the invention, the minimum requirements of a CPO may be designed to discourage utilization of this system by business travelers, last-minute travelers and other passengers who are typically willing to pay full-fare. For example, business travelers will be discouraged if the CPO rules require a Saturday night stay or significant flexibility by the customer on both the departure and return portions of the customer's itinerary. In this manner, business travelers, who are typically unwilling to lose up to a full day at either end of their trip, will be discouraged from purchasing such discounted tickets. Thus, the present invention permits airlines to fill otherwise empty seats in a manner that stimulates latent and unfulfilled leisure travel demand while leaving underlying fare structures of the airlines intact.

According to a further aspect of the invention, an airline can correct for forecasting errors, if necessary, or other competitive forces which have produced unanticipated excess capacity, by releasing tickets for sale to CPO customers. Due to the confidential nature of the CPO rules, and the discouraged use of CPO tickets by full-fare business travelers, the airlines can sell such excess capacity at a discount, without undermining its existing published fare structure.

A more complete understanding of the present invention, as well as further features and advantages of the present invention, will be obtained by reference to the following detailed description and drawings.

BRIEF DESCRIPTION OF THE DRAWINGS

FIG. 6 illustrates a sample table from the customer database of FIG. 2;

FIG. 7 illustrates a sample table from the airline database of FIG. 2;

FIG. 8 illustrates a sample table from the flight schedule database of FIGS. 2 and 4;

FIGS. 9a and 9b, collectively, illustrate a sample table from the CPO database of FIG. 2;

FIG. 10a illustrates a sample table from the secured airlines rules database of FIG. 3;

FIGS. 10b and 10c, collectively, illustrate alternative sample tables to the secured airlines rules database of FIG. 3;

FIG. 11 illustrates a sample table from the counteroffer rules database of FIG. 3;

FIG. 12 illustrates a sample table from the secured airline audit database of FIG. 3;

FIG. 13 illustrates a sample table from the pricing and restrictions database of FIGS. 4 and 5a;

FIG. 14 illustrates a sample table from the seat allocation database of FIGS. 4 and 5a;

FIG. 15 illustrates a sample table from the forecast and demand analysis database of FIG. 5a;

FIG. 19 is a flow chart describing an exemplary CPO rule generation process implemented by the revenue management system of FIG. 5a.

DETAILED DESCRIPTION

Figure 1:
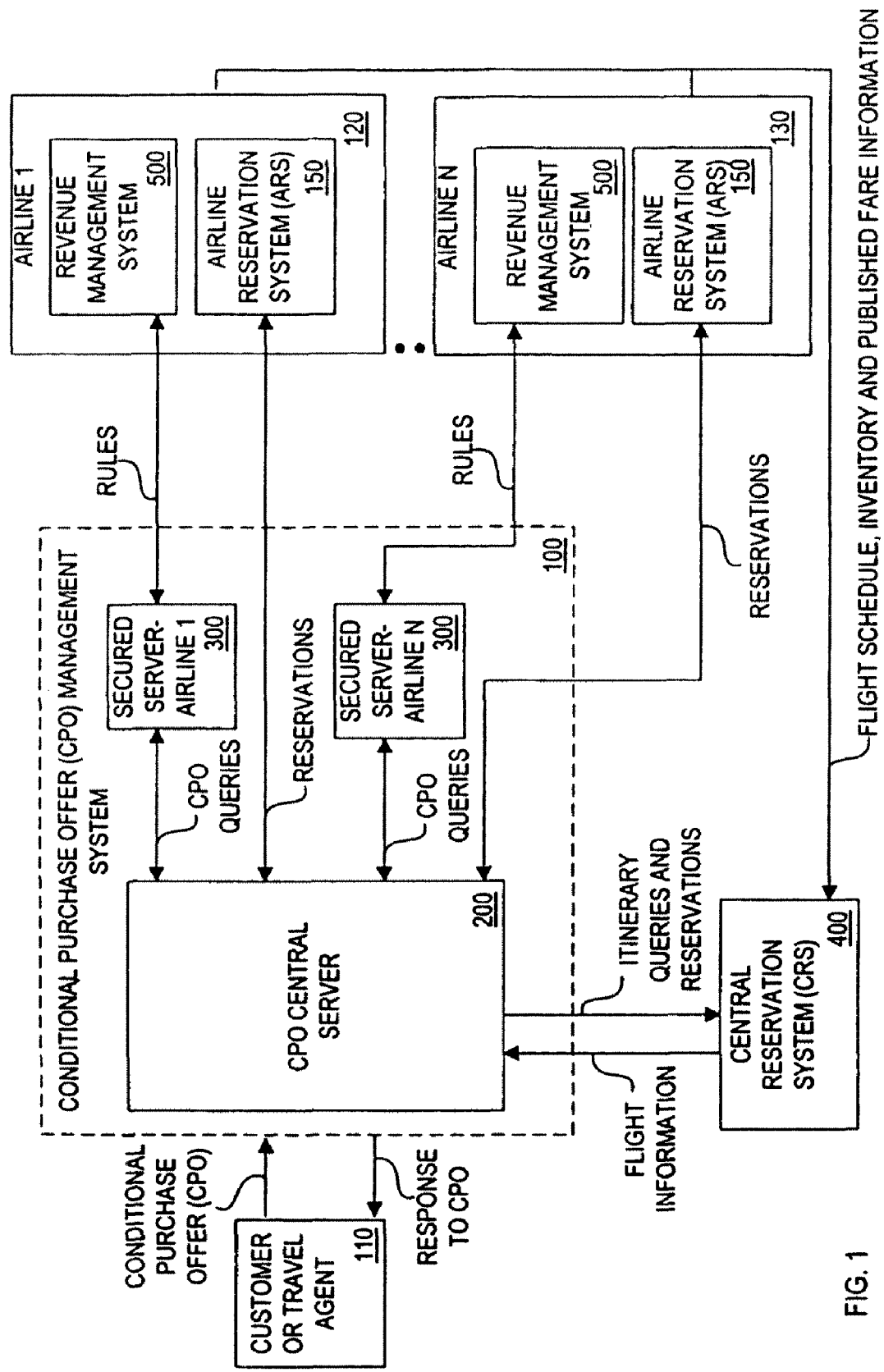
FIG. 1 is a schematic block diagram illustrating a conditional purchase offer (CPO) management system in accordance with one embodiment of the present invention.

FIG. 1 shows a conditional purchase offer (CPO) management system 100 for receiving conditional purchase offers from one or more customers or travel agents 110, hereinafter referred to as customer 110, and for evaluating the received CPOs against a number of CPO rules defined by a plurality of sellers, such as airlines 120, 130, to determine whether any seller is willing to accept a given CPO. As discussed further below, if a seller accepts a given CPO, the CPO management system 100 binds the customer 110 on behalf of the accepting seller 130, to form a legally binding contract.

As used herein, a CPO is a binding offer containing one or more conditions submitted by a customer 110 for the purchase of an item, such as air travel, at a customer-defined price. In the illustrative airline embodiment, the customer-defined conditions would include itinerary parameters, such as the origin and destination cities; acceptable dates and times of departure and return; and whether connecting flights or stopovers are acceptable to the customer. In addition, the parameters of a CPO may allow a customer to specify one or more preferred airline(s), flights, seat assignments, seat class, aircraft type, refund/change rules, or maximum layover time.

As discussed further below, a CPO rule is a set of restrictions defined by a given seller, such as an airline, to define a combination of such restrictions for which the seller is willing to accept a predefined minimum price. In a preferred embodiment, the CPO rules are generated by the revenue management system 500 of the respective airline. In alternate embodiments, the CPO rules may be generated by a yield management system, a profit management system, or any system which controls and manages inventory.

As discussed more fully below in conjunction with FIGS. 5b and 19, the revenue management system 500 will employ a CPO rules generation process 1900 to generate CPO rules by evaluating current inventory, pricing and revenue information, as well as historical patterns and external events, to forecast future travel. Thereafter, the CPO rules are utilized by the CPO management system 100 to render a decision to either accept, reject or counter a CPO on behalf of a particular airline. According to a feature of the present invention, the CPO rules are dynamic in nature and may be updated by a given airline, as necessary.

For example, a CPO rule for a given airline can specify that the airline will accept any CPO for travel between Newark, N.J. (EWR) and Orlando, Fla. (MCO) during the month of October, 1997, provided that (i) the customer travels between Tuesday and Thursday, (ii) the tickets are booked within 21 days of departure, (iii) the price is at least $165 per ticket, (iv) K-class inventory is available on all flight segments of the customer's itinerary, and (v) there are at least two (2) passengers travelling together.

Although the CPO management system 100 is illustrated herein as a system for selling airline tickets, the CPO management system 100 could be utilized to sell any good or service, such as automobiles, insurance, computer equipment, or hotel accommodations, as would be apparent to a person of ordinary skill. For a more detailed discussion of a general CPO management system for selling such items, see U.S. patent application Ser. No. 08/707,660, filed Sep. 4, 1996, the parent application to the present invention, which is incorporated by reference herein. It is noted that in such alternate embodiments, the revenue management system 500, discussed below in conjunction with FIGS. 5a through 5c, may be embodied as an inventory management system or any other system utilized by the seller to establish pricing and inventory information for the respective item.

CPO Management System

As shown in FIG. 1, the CPO management system 100 preferably includes a CPO management central server 200 and one or more secured airline servers 300. As discussed further below in conjunction with FIG. 3, each secured airline server 300 may be associated with one or more airlines and each server 300 stores, among other things, the CPO rules defined by any associated airlines, such as the airline 120. Each secured airline server 300 may be remotely located from the CPO management central server 200, as shown in FIG. 1, or may be integrated with the CPO management central server 200. In one remote embodiment, the secured airline server 300 associated with each airline may be physically located at a processing facility secured by the particular airline, or at the physical location of a third party.

The particular location of the secured airline servers 300 will dictate the nature of the information that is transmitted between the airlines 120, 130 and the CPO management system 100, as would be apparent to a person of ordinary skill. For example, if the secured airline servers 300 are integrated with the CPO management central server 200, or are otherwise remotely located from the respective airlines 120, 130, then the respective airline 120, 130 will transmit the CPO rules to the location of the airline's associated secured airline server 300 for storage of the CPO rules and application of the CPO rules against each received CPO. Likewise, if the secured airline servers 300 are physically located at the processing facility secured by the associated airline, then the CPO management central server 200 will transmit the CPOs to each airline for processing and the airlines will return the response for each CPO to the CPO management central server 200.

The CPO rules contain sensitive information, including price flexibility and available capacity, which, if known to an airline's competitors or customers, could dramatically impact the airline's overall revenue structure. Thus, according to a feature of the present invention, the CPO rules are preferably securely stored by each airline server 300, if necessary, to prevent one airline 120 from accessing, obtaining or altering the CPO rules of another airline 130. In one embodiment, the secured airline servers 300 utilize computer security techniques, such as database access control mechanisms. In this manner, the integrity and confidentiality of the CPO rules are maintained in the potentially hostile computing environment.

In addition, according to a further feature of the invention, the CPO management system 100 prevents customers 110 from submitting multiple CPOs containing a progressively increasing price in order to identify the airline's defined minimum price for a given flight. For example, if the CPO will be binding upon the customer 110 if accepted by any airline 120, the customer 100 will be discouraged from "pinging" the CPO management system 100 to identify the airline's underlying price flexibility. In addition, the CPO management system 100 can limit the number of CPOs which any customer 110 can submit within a predefined time period.

In alternate embodiments, the customer or travel agent 110 can be charged a fee or a penalty if a ticket is not booked when at least one airline has accepted the CPO or the CPO management system 100 can evaluate a rating of said customer 110 containing information regarding the likelihood that said customer 110 will book a ticket corresponding to said CPO. For a more detailed description of a suitable rating system, see U.S. patent application Ser. No. 08/811,349, filed Mar. 4, 1997, entitled AIRLINE PRICE INQUIRY METHOD AND SYSTEM, assigned to the assignee of the present invention and incorporated by reference herein. In one embodiment, the evaluated rating comprises a ratio of bookings to purchase offers by said customer 110. In this manner, the airline can be confident that if the airline accepts the customer's offer, the customer will book the ticket without using the information to ascertain the airline's underlying level of price flexibility. The particular location of a given secured airline server 300 may also impact the level of security measures that the associated airline(s) may desire for the sensitive CPO rules. For example, if a given secured airline server 300 is dedicated to a single airline and is physically located at a processing facility secured by the associated airline, then the respective airline may implement its own minimal security measures to control the processing of each CPO against its own CPO rules, if desired, and thereby maintain the integrity and confidentiality of the price-sensitive information incorporated into the CPO rules. If, however, a given secured airline server 300 stores the CPO rules for a plurality of airlines and is remotely located from such airlines, then the importance of implementing computer security and database access control mechanisms may be increased, as would be apparent to a person of ordinary skill.

As discussed further below, each customer 110 contacts the CPO management system 100, for example, by means of telephone, facsimile, online access, e-mail, in-person contact or through a travel agent, and provides the CPO management system 100 with the terms of their CPO. It is noted that each customer 110 may employ a general-purpose computer for communicating with the CPO management system 100. The general-purpose computer of each customer 110 is preferably comprised of a processing unit, a modem, memory means and any software required to communicate with the CPO management system 100.

Once the terms of the CPO have been received by the CPO management system 100, the CPO management central server 200 will execute a CPO management process 1600, discussed below in conjunction with FIGS. 16a through 16c, to compare the received CPO against the CPO rules of each airline. A result of this comparison, the CPO is either accepted, rejected or countered. Thereafter, the customer 110 is notified of the response of the airlines to the CPO. If an airline accepts the CPO, or if the customer 110 accepts a counteroffer from an airline, a ticket is then booked by the CPO management system 100 with the appropriate restrictions which meet the conditions defined by the customer 110.

According to a further feature of the present invention, the minimum requirements of a CPO are designed to discourage utilization of this system by business travelers or last-minute travelers who are typically willing to pay full-fare. For example, business travelers will be discouraged if the CPO rules require a Saturday night stay or significant flexibility by the customer 110 on the time of both the departure and return portions of the customer's itinerary. In this manner, business travelers, who are typically unwilling to lose up to a full day at either end of their trip, will be discouraged from purchasing such discounted tickets. Thus, the present invention permits airlines to fill otherwise empty seats in a manner that stimulates latent and unfulfilled leisure travel demand while leaving underlying fare structures of the airlines 120, 130 intact.

Likewise, in embodiments where the CPO management system is utilized for the sale of any item, the minimum requirements of a CPO are preferably designed to discourage utilization of this system by customers who are typically willing to pay the full retail price. For example, when selling fashion items, CPO customers can be required to purchase fashions from the previous season. Similarly, the CPO rules can be designed to require the purchase of multiple quantities of a given item, and thereby discourage use by consumers looking for one item, who are more likely to pay the full retail price.

In a preferred embodiment, the CPO management system 100 may optionally access a central reservation system (CRS) 400, discussed below in conjunction with FIG. 4, to perform itinerary queries that will identify particular flights which satisfy a given itinerary, and to make reservations. The central reservation system (CRS) 400 may be embodied, for example, as an existing conventional reservation system, such as Apollo, Sabre, System One or Worldspan.

In addition, the CPO management system 100 could alternatively access the proprietary airline reservation systems (ARSs) 150 of each airline to perform such itinerary queries and to make reservations with the respective airline. The airline reservation systems (ARSs) 150 maintained by each airline 120, are each essentially a subset of the central CRS 400. Thus, in view of the overlapping functions and capabilities of the CRS 400 and the proprietary reservation systems 150 of each airline, the CPO management system 100 could access any of such systems to obtain required information, and the terms "CRS" and "ARS" are used interchangeably herein.

As shown in FIG. 1, each airline 120, 130, also has a revenue management system (RMS) 500, discussed further below in conjunction with FIGS. 5a through 5c. The RMS 500 may be embodied as a conventional RMS, as modified herein to generate CPO rules and to otherwise allocate and price airline tickets for sale to CPO customers.

Generally, the revenue management systems (RMSs) 500 are utilized to optimize revenue per flight, in a known manner. An RMS performs seat inventory control by periodically adjusting nested booking limits ("buckets") for the various fare classes, in order to optimize the passenger mix and thereby maximize the generated revenue.

The CPO management system 100, customer 110, airlines 120, 130 and central reservation system 400 (collectively, the "nodes") preferably transmit digitally encoded data and other information between one another. The communication links between the nodes preferably comprise a cable, fiber or wireless link on which electronic signals can propagate. For example, each node may be connected via an Internet connection using a public switched telephone network (PSTN), such as those provided by a local or regional telephone operating company. Alternatively, each node may be connected by dedicated data lines, cellular, Personal Communication Systems ("PCS"), microwave, or satellite networks.

Figure 2:
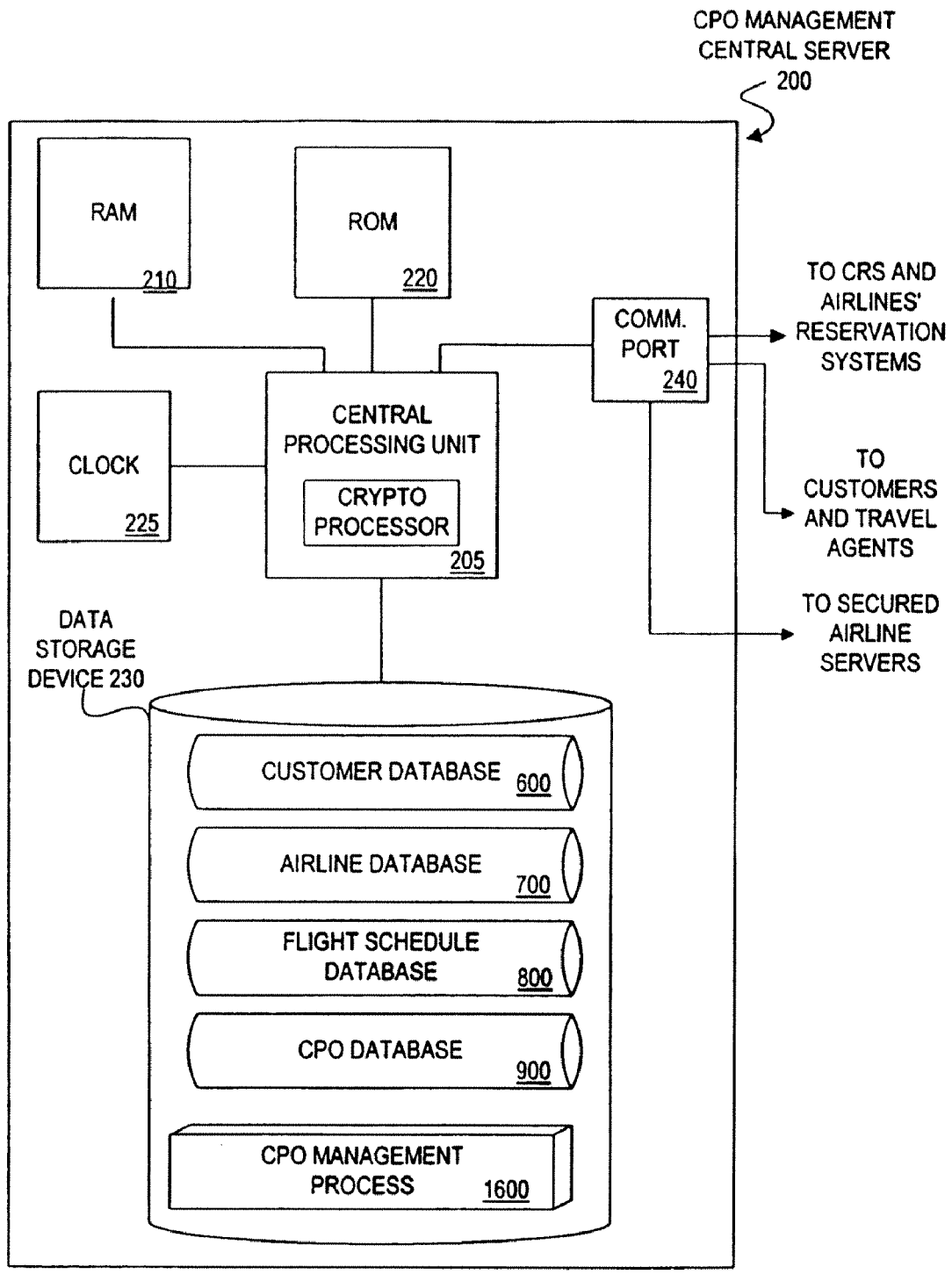
FIG. 2 is a schematic block diagram of the exemplary CPO management central server of FIG. 1.

FIG. 2 is a block diagram showing the architecture of an illustrative CPO management central server 200. The CPO management central server 200 preferably includes certain standard hardware components, such as a central processing unit (CPU) 205, a random access memory (RAM) 210, a read only memory (ROM) 220, a clock 225, a data storage device 230, and communications ports 240, 250, 260. The CPU 205 is preferably linked to each of the other listed elements, either by means of a shared data bus, or dedicated connections, as shown in FIG. 2.

The CPU 205 may be embodied as a single commercially available processor, such as Intel's Pentium 100 MHz P54C microprocessor, Motorola's 120 MHz PowerPC 604 microprocessor or Sun Microsystem's 166 MHz UltraSPARC-I microprocessor. Alternatively, the CPU 205 may be embodied as a number of such processors operating in parallel.

The ROM 220 and/or data storage device 230 are operable to store one or more instructions, discussed further below in conjunction with FIG. 16, which the CPU 205 is operable to retrieve, interpret and execute. For example, the ROM 220 and/or data storage device 230 preferably store processes to accomplish the transfer of required payments, charges and debits, between the airlines 120, 130 and customers 110. In particular, as discussed below in conjunction with FIG. 16c, the CPO management process 1600 preferably transmits the credit card information associated with a given customer 110 to the credit card issuer for payment, if a ticket is actually issued to the customer 110. The processing of such accounting transactions are preferably secured in a conventional manner, for example, using well known cryptographic techniques.

The CPU 205 preferably includes a control unit, an arithmetic logic unit (ALU), and a CPU local memory storage device, such as, for example, a stackable cache or a plurality of registers, in a known manner. The control unit is operable to retrieve instructions from the data storage device 230 or ROM 220. The ALU is operable to perform a plurality of operations needed to carry out instructions. The CPU local memory storage device is operable to provide high-speed storage used for storing temporary results and control information.

As discussed further below in conjunction with FIGS. 6 through 9, respectively, the data storage device 230 includes a customer database 600, an airline database 700, a flight schedule database 800, and a CPO database 900. The customer database 600 preferably stores information on each customer of the CPO management system 100, including biographical information and billing information, such as a credit card number. The airline database 700 preferably stores information on each airline which is registered with the CPO management system 100 to sell airline tickets to CPO customers, including address and contact information. The flight schedule database 800 preferably stores specific flight information for each O & D Pair. Finally, the CPO database 900 preferably contains a record of each CPO being processed by the CPO management system 100, including the terms of the CPO and the associated status.

In addition, the data storage device 230 includes a CPO management process 1600, discussed further below in conjunction with FIG. 16. Generally, the CPO management process 1600 receives each CPO from a customer 110, compares the CPO against the CPO rules of each airline 120, 130, and determines whether to accept, reject or counter the CPO on behalf of an airline.

The communications port 240 connects the CPO management central server 200 to the central reservation system (CRS) 400 and the proprietary reservation systems (ARSs) 150 maintained by each airline 120, 130. The communications port 250 connects the CPO management central server 200 to individual customers and travel agents, such as the customer 110, for example, by means of an Internet connection using the public switched telephone network (PSTN). The communications port 260 connects the CPO management central server 200 to any remote secured airline servers 300. The communications ports 240, 250, 260 each preferably include multiple communication channels for simultaneously establishing a plurality of connections. It is noted that although the CPO management central server 200 is illustrated as having three separate communication ports 240, 250, 260, the CPO management central server 200 could alternatively be implemented with a single connection to an ethernet network, which in turn provides the central server 200 with a connection to the various nodes.

Figure 3:
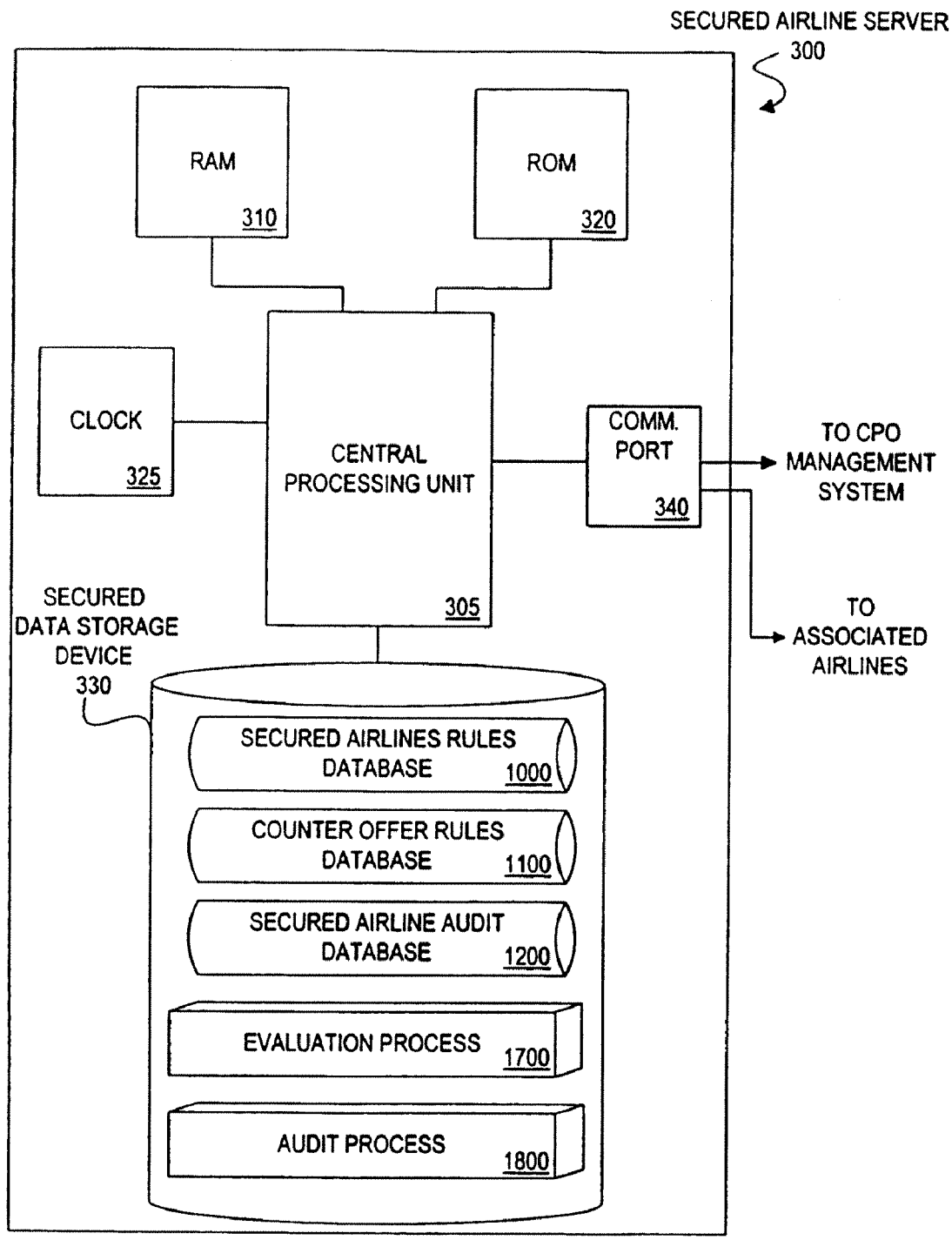
FIG. 3 is a schematic block diagram of the exemplary secured airline server of FIG. 1.

FIG. 3 is a block diagram showing the architecture of an illustrative secured airline server 300. As previously indicated, the CPO management system 100 may utilize one or more secured airline servers 300, each supporting one or more airlines 120, 130. Each secured airline server 300 preferably includes certain standard hardware components, such as a central processing unit (CPU) 305, a random access memory (RAM) 310, a read only memory (ROM) 320, a clock 325, a data storage device 330, and communications ports 340, 345. Each of these components may be identical to those described above in conjunction with FIG. 2.

As previously indicated, in one embodiment, the CPO rules may be stored in a secure database to maintain the integrity and confidentiality of the highly sensitive information included in each CPO rule. Thus, the secured airline server 300 preferably uses a secure database, such as the products commercially available from Oracle, Informix or IBM.

As discussed further below in conjunction with FIGS. 10 through 12, respectively, the data storage device 330 includes a secured airline rules database 1000, a counteroffer rules database 1100, and a secured airline audit database 1200. The secured airline rules database 1000 preferably maintains the CPO rules for the one or more airlines associated with the secured airline server 300. The counteroffer rules database 1100 is preferably stored by each secured airline server 300 to maintain a set of tolerances which may be utilized by the CPO management system 100 to generate a counteroffer to a CPO on behalf of an airline, if the CPO is within predefined tolerances of one or more restrictions associated with a given CPO rule. As previously indicated, the secured airline rules database 1000 and the counteroffer rules database 1100 may be stored in an encrypted format to maintain the integrity and confidentiality of the highly sensitive information included in the CPO rules. The secured airline audit database 1200 preferably maintains an audit trail for each CPO that is processed by the CPO management system 100.

In addition, the data storage device 330 includes an evaluation process 1700 and an audit process 1800, discussed further below in conjunction with FIGS. 17 and 18, respectively. Generally, the evaluation process 1700 is a subroutine executed by the CPO management process 1600, which receives a CPO and compares the CPO against the rules of one airline, such as the airline 120, to generate a response on behalf of the airline to the given CPO. The audit process 1800 is a subroutine executed by the CPO management process 1600 to maintain an audit trail for each CPO that is processed by the CPO management system 100.

The communications port 340 connects the secured airline server 300 to the CPO management central server 200. The communications port 345 connects the secured airline server 300 to the associated airlines(s) 120. The communications ports 340, 345 preferably include multiple communication channels for simultaneously establishing a plurality of connections.

Central Reservation System

Figure 4:
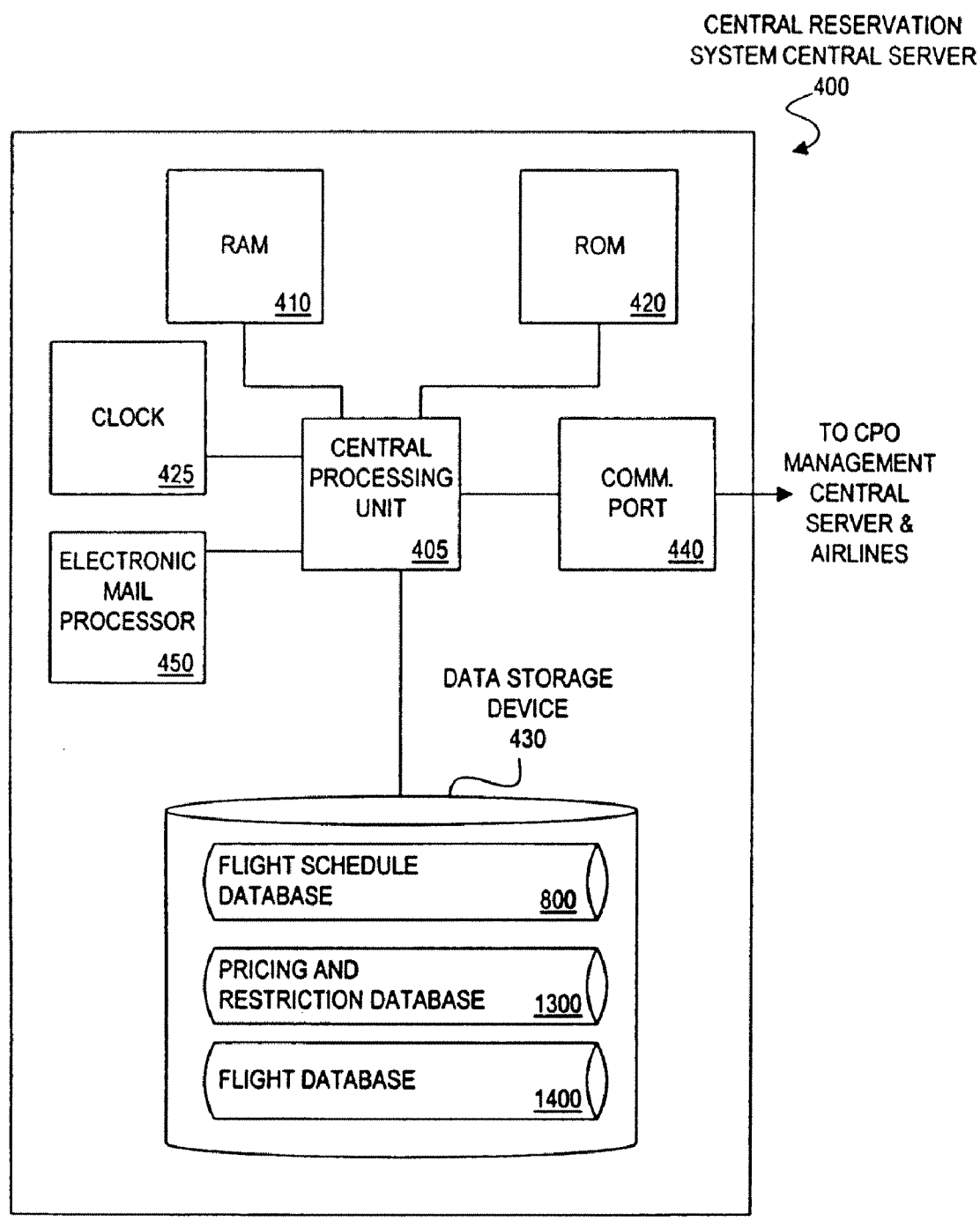
FIG. 4 is a schematic block diagram of the exemplary central reservation system of FIG. 1.

FIG. 4 is a block diagram showing the architecture of an illustrative central reservation system (CRS) server 400. The CRS 400 preferably includes certain standard hardware components, such as a central processing unit (CPU) 405, a random access memory (RAM) 410, a read only memory (ROM) 420, a clock 425, a data storage device 430, and a communications port 440. Each of these components may be identical to those described above in conjunction with FIG. 2.

The ROM 420 and/or data storage device 430 are operable to store one or more instructions, for processing (1) flight information received from the airlines; (2) itinerary inquiries regarding flight availability; and (3) ticket bookings, in a known manner, which the CPU 405 is operable to retrieve, interpret and execute.

As discussed further below in conjunction with FIGS. 8, 13 and 14, respectively, the data storage device 430 includes a flight schedule database 800, a pricing and restrictions database 1300, and a seat allocation database 1400. As previously indicated, the flight schedule database 800 contains essentially the same flight information as the database of the same name which is stored by the CPO management central server 200, namely, specific flight information for each O & D Pair. The pricing and restrictions database 1300 maintains pricing information and related restrictions for each fare class on a given flight offered by the airlines 120, 130. The seat allocation database 1400 maintains available inventory information for each fare class on a given flight offered by the airlines 120, 130.

The communications port 440 connects the CRS 400 to the CPO management central server 200 and to each airline, such as the airlines 120, 130. The CRS 400 preferably includes an electronic mail processor 450 for processing and storing e-mail messages transmitted between the CRS 400 and the various customers 110, airlines 120, 130 and the CPO management system 100.

Revenue Management System

Figure 5:
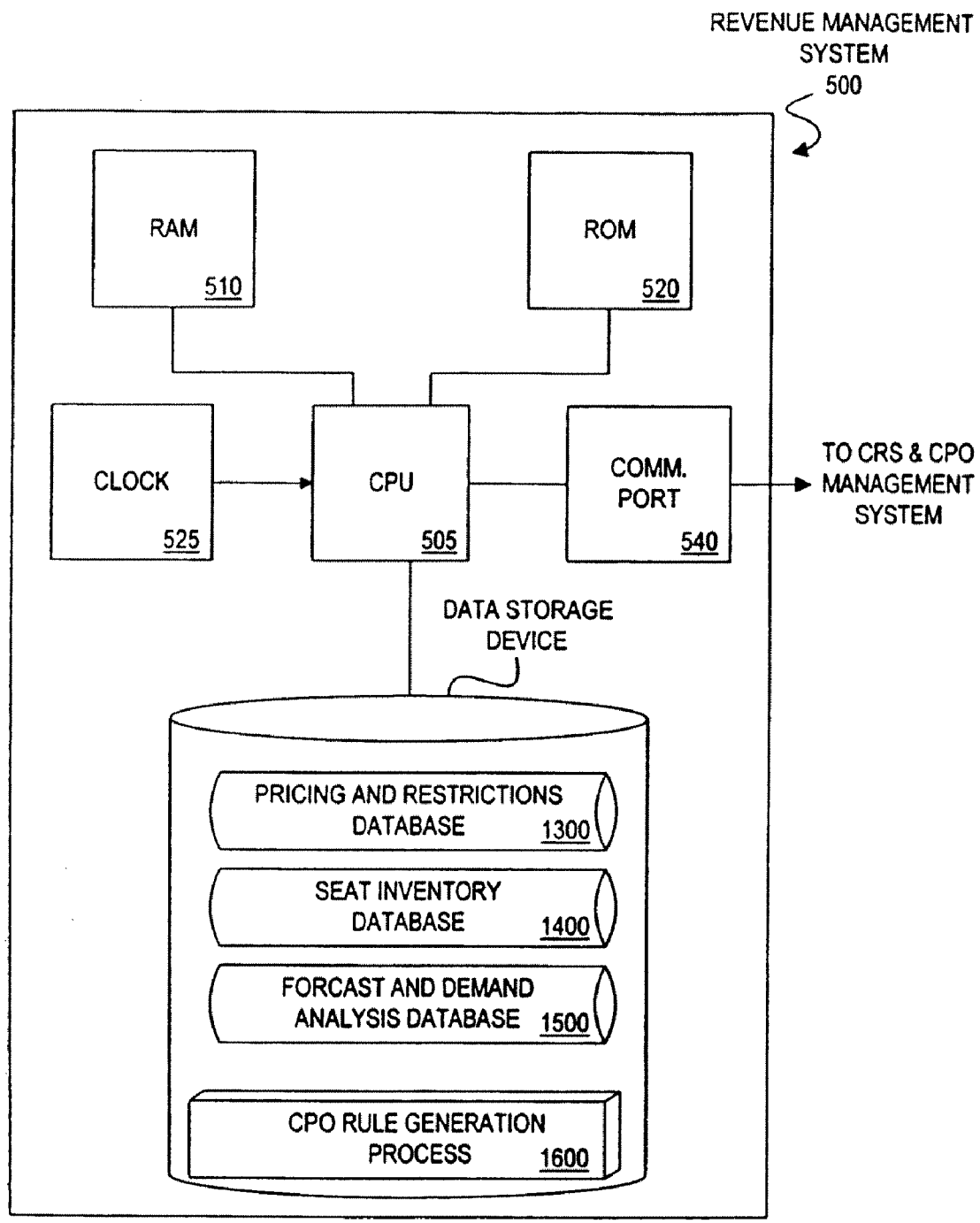
FIG. 5 is a schematic block diagram of the exemplary reservation management system (RMS) of FIG. 1.

FIG. 5a is a block diagram showing the architecture of an illustrative revenue management system (RMS) 500, as maintained by each airline, such as the airline 120. As previously indicated, the RMS 500 may be embodied as a conventional RMS, such as an RMS commercially available from Sabre Decision Technologies, as modified herein to generate CPO rules and to otherwise allocate and price airline tickets for sale to CPO customers. In this manner, the RMS 500 makes a portion of the inventory of an airline 120 available for sale to CPO customers 110. It is noted that the RMS for many airlines performs only the function of inventory allocation and does not incorporate a pricing function. In such cases, a separate system, such as a manual process, is utilized to price inventory which has been allocated by the RMS. In the illustrative embodiment disclosed herein, the RMS 500 performs both the inventory allocation and pricing functions.

The RMS 500 preferably includes certain standard hardware components, such as a central processing unit (CPU) 505, a random access memory (RAM) 510, a read only memory (ROM) 520, a clock 525, a data storage device 530, and a communications port 540. Each of these components may be identical to those described above in conjunction with FIG. 2.

The ROM 520 and/or data storage device 530 are operable to store one or more instructions, for analyzing current seating inventory and revenue, as well as historical patterns, to allocate and price available seat inventory in an effort to maximize revenue for the airline, which the CPU 405 is operable to retrieve, interpret and execute.

As discussed further below in conjunction with FIGS. 13 through 15, respectively, the data storage device 530 includes a pricing and restrictions database 1300, and a seat allocation database 1400, which each contain essentially the same information as the databases of the same name stored by the CRS 400, as well as a forecast and demand analysis database 1500. As previously indicated, the pricing and restrictions database 1300 maintains pricing information and related restrictions for each fare class on a given flight offered by the associated airline 120, and the seat allocation database 1400 maintains available inventory information for each fare class on a given flight offered by the associated airline 120. The forecast and demand analysis database 1500 contains information on each selling price for each fare class for a given flight, and the forecasted demand at each selling price as established by the RMS 500. In addition, the data storage device 530 preferably includes a CPO rules generation process 1900, discussed below in conjunction with FIG. 19, to generate CPO rules by evaluating current inventory, pricing and revenue information, as well as historical patterns, to forecast future travel.

The communications port 540 connects each RMS 500 to the CRS 400 and the CPO management system 100.

Figure 5B:
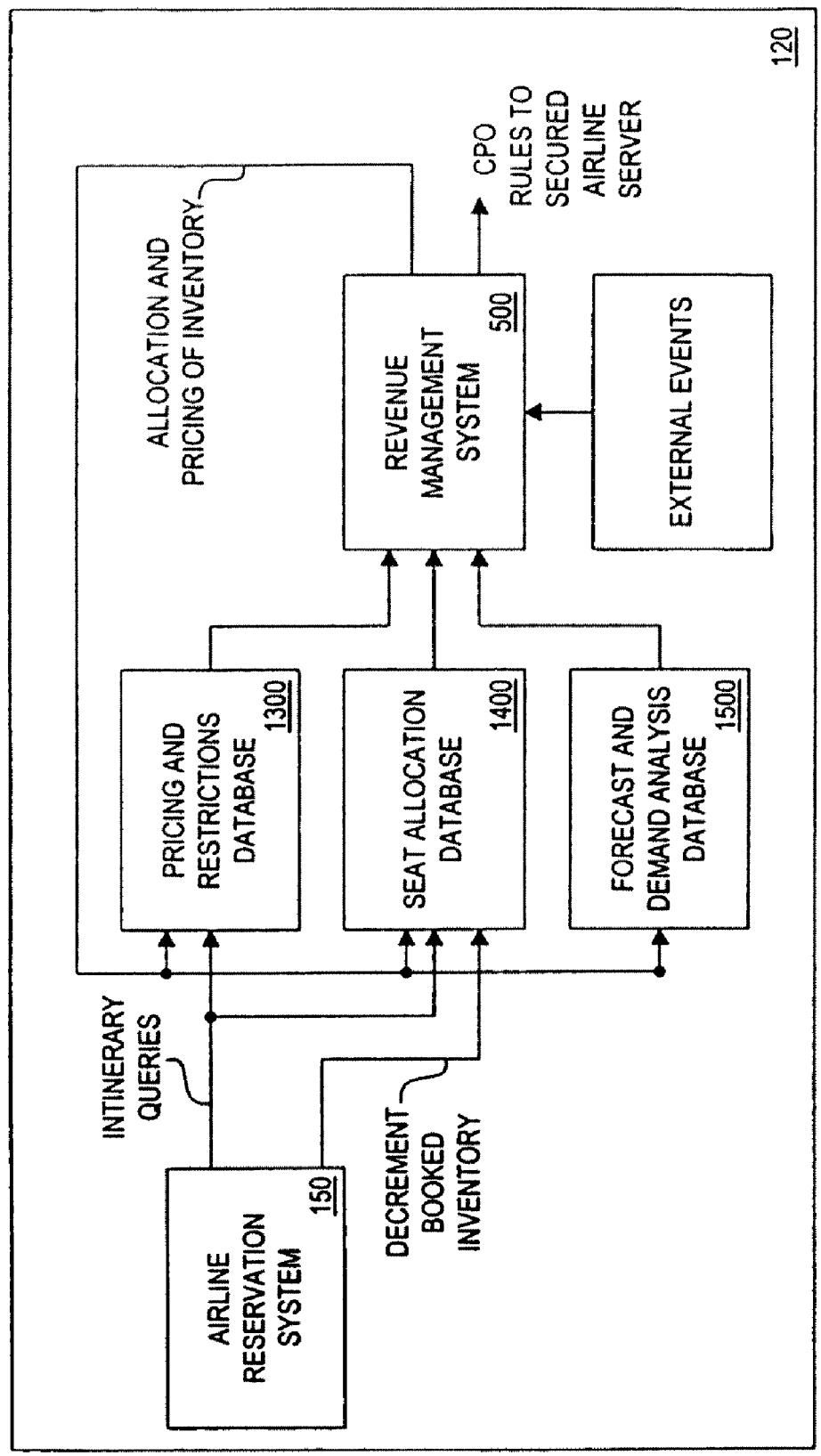
FIG. 5b illustrates the interaction between the RMS, the airline reservation system and the various databases depicted in FIG. 5a, during a conventional pricing and allocation process and the CPO rules generation process of FIG. 19.

FIG. 5b illustrates the manner in which the RMS 500 utilizes a number of databases and other tools in implementing a conventional pricing and allocation process and the CPO rules generation process 1900. The particular format and content of the illustrative databases shown in FIG. 5b are discussed in detail below in conjunction with FIGS. 13 through 15. It is noted that the conventional pricing and allocation process and the CPO rules generation process 1900 may be executed by the RMS 500 initially when a flight is first added to the flight schedule, and then periodically to reallocate and price available inventory in response to demand and external events.

Thus, when a flight is first added to the flight schedule of an airline 120, a record of the flight is preferably created by the airline reservation system 150 in the flight schedule database 800 with the appropriate itinerary information. In addition, the RMS 500 will perform a conventional pricing and allocation process in conjunction with the CPO rules generation process 1900, shown in FIG. 19, to initially populate the respective fields of the pricing and restrictions database 1300, seat allocation database 1400, and forecast and demand analysis database 1500 for the flight, as shown in FIG. 5b.

Generally, during the initial pricing and allocation process for a given flight, the RMS 500 attempts to maximize revenue by establishing a plurality of fare classes and allocating the number of seats and price assigned to each fare class. The initial seat allocation and pricing information is stored in the seat allocation database 1400 and the pricing and restrictions database 1300, respectively. The initial price for each fare class and the forecasted demand is preferably stored in the forecast and demand analysis database 1500. In one embodiment, a separate fare class can be established by the RMS 500 for selling tickets to CPO customers. Since tickets to CPO customers are generally sold at a discount, the RMS 500 preferably only initially allocates seats to the CPO fare class which are forecasted to be empty or unlikely to be sold when the flight actually departs. As is well known, an airline can utilize a conventional RMS 500 to predict, based on available historical data, whether or not there will be empty seats on a given flight.

As shown in FIG. 5*b*, the airline reservation system (ARS) 150 will access the established pricing and restrictions database 1300 and seat allocation database 1400 to perform itinerary queries. In addition, as tickets are sold by the airline 120, the ARS 150 will preferably decrement the available inventory in the seat allocation database 1400. In this manner, the seat allocation database 1400 maintains an up-to-date representation of the available inventory on each flight.

Figure 5C:
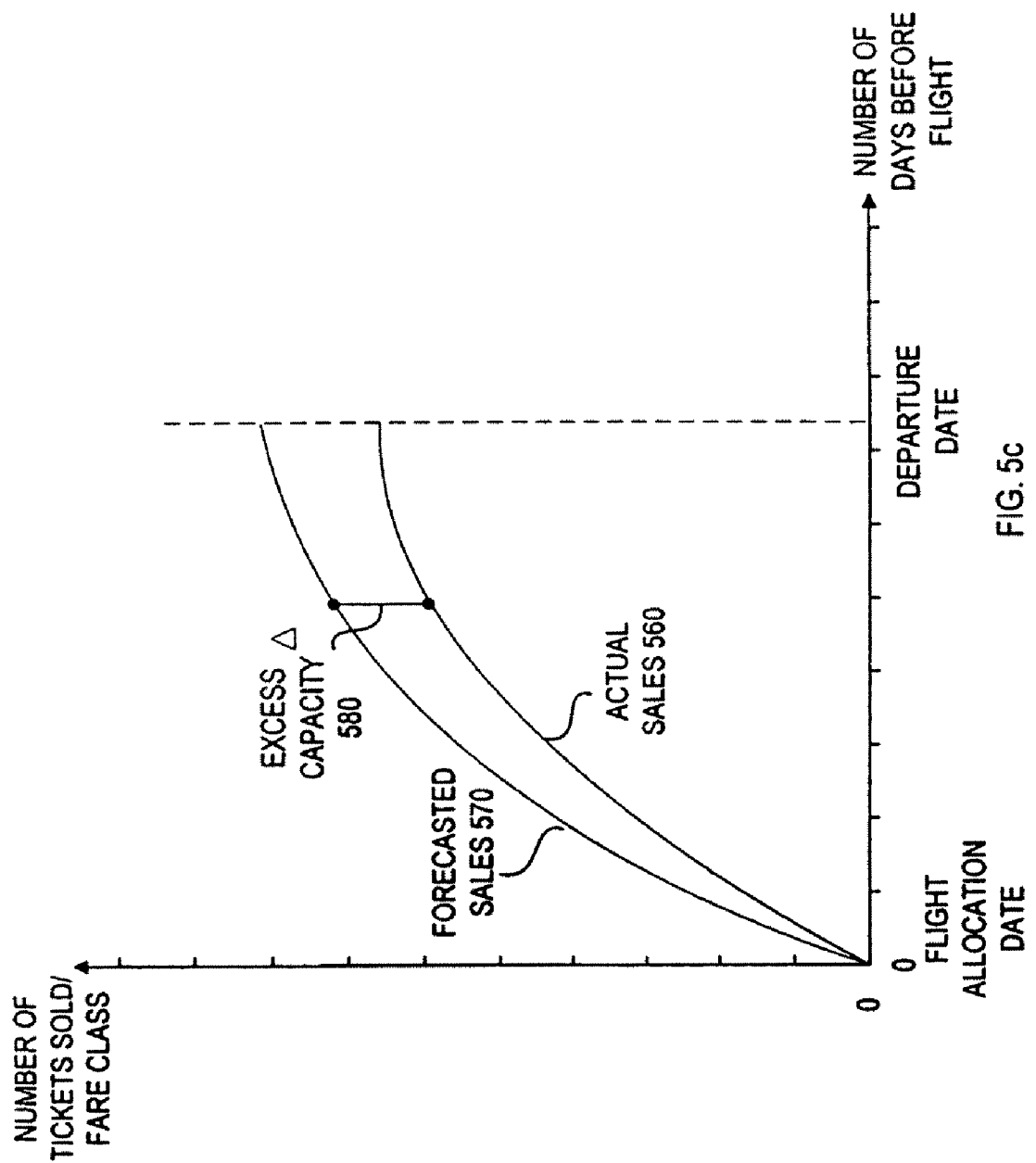
FIG. 5c illustrates the actual demand over time for airline tickets within a given fare class, relative to forecasted demand.

The RMS 500 will continue to monitor the actual demand 560 within each fare class relative to forecasted demand 570, as illustrated by FIG. 5*c*, to dynamically reevaluate the inventory allocation and pricing of each fare class for a given flight in order to minimize the unanticipated excess inventory delta 580. The RMS 500 monitors current actual demand information by retrieving detailed inventory data from the seat allocation database 1400 or summary information from the forecast and demand analysis database 1500. In addition, the RMS 500 will utilize the historical demand information stored in the forecast and demand analysis database 1500 for prior periods, which essentially provides a demand curve for each selling price of a given fare class on each flight. For example, when allocating and pricing inventory for a given flight, the RMS 500 may analyze demand trends for similar flights from previous relevant time periods, in a known manner. It is also noted that conventional RMSs typically respond to competitive forces and other external events, such as price wars or increased demand due to a large event, such as the Olympics, as shown in FIG. 5*b*.

According to a feature of the present invention, an airline 120 can correct for forecasting errors, if necessary, or other competitive forces which have produced unanticipated excess capacity 580, by releasing tickets for sale to CPO customers. Due to the confidential nature of the CPO rules, and the discouraged use of CPO tickets by full-fare business travelers, the airlines 120, 130 can sell such excess capacity at a discount, without undermining its existing published fare structure. Thus, in a preferred embodiment, the RMS 500 will periodically execute the CPO rule generation process 1900, discussed below in conjunction with FIG. 19, to generate CPO rules that encourage the sale of tickets to CPO customers.

Databases

FIG. 6 illustrates an exemplary customer database 600 that preferably stores information on each customer of the CPO management system 100, including biographical information and billing information, such as a credit card number. The customer database 600 maintains a plurality of records, such as records 605-615, each associated with a different customer. For each customer name listed in field 640, the customer database 600 includes the customer's address in field 645 and credit card number in field 655. In addition, the customer account database, 600 preferably includes an identification (ID) number in field 660. The ID number stored in field 660 may be utilized, for example, to index a historical database (not shown) of previous ticket purchases and CPOs associated with the customer.

FIG. 7 illustrates an exemplary airline database 700 which preferably stores information on each airline which is registered with the CPO management system 100 to sell airline tickets to CPO customers, including address and contact information. The airline database 700 maintains a plurality of records, such as records 705-715, each associated with a different airline. For each airline name listed in field 740, the airline database 700 includes address and contact information in fields 745 and 750, respectively. The contact information may comprise, for example, the name of an individual employee of the airline 120 and a corresponding telephone number, web page URL, bulletin board address, pager number, telephone number, electronic mail address, voice mail address or facsimile number.

In addition, in an embodiment where the CPO rules of a given airline are stored in an encrypted format, the cryptographic key of the associated airline is preferably stored in field 755 of the airline database 700. Finally, the airline database 700 preferably stores an indication in field 760 of the percentage of CPOs which have been offered to each airline which have actually been accepted by the respective airline. In this manner, the CPO management system 100 can offer a particular CPO to airlines in a sequence that is ranked in accordance with the CPO acceptance rate, as discussed further below in conjunction with FIG. 16*b*. In alternate embodiments, the airline database 700 can incorporate fields to facilitate the processing of CPOs in accordance with sequences based on (i) the amount of inventory made available by each airline for sale to CPO customers, (ii) priorities negotiated by each airline, such as an airline priority over certain routes, or (iii) the highest commission rates paid by the airlines to the CPO management system 100.

FIG. 8 illustrates an exemplary flight schedule database 800 which preferably stores specific flight information for each O & D Pair, as well as connection information. The flight schedule database 800 maintains a plurality of records, such as records 805-815, each associated with a different flight. For each O & D Pair listed in fields 840 and 845, the flight schedule database 800 includes the date of each flight in field 850, as well as the times of departure and arrival of the respective flight in fields 855 and 860. The airline and flight number associated with each flight are preferably indicated in fields 865 and 870, respectively, and any required connections are indicated in field 875.

FIGS. 9*a* and 9*b* illustrate an exemplary CPO database 900 which preferably contains a record of each CPO being processed by the CPO management system 100, including the terms of the CPO and the associated status. The CPO database 900 maintains a plurality of records, such as records 905 and 910, each associated with a different CPO being processed by the system 100. For each CPO identified by CPO number in field 920, the CPO database 900 includes the date the CPO was received in field 925, and an identification (ID) number for the travel agent, if any, associated with the CPO in field 930. It is noted that the travel agent ID number stored in field 930 may be utilized, for example, to index a historical database (not shown) of previous ticket purchases and CPOs associated with the travel agent.

In addition, the CPO database 900 identifies the customer by name in field 935, and by identification number in field 940 and identifies any companion passengers in field 945. The ID number stored in field 945 is preferably utilized to cross-reference the corresponding information stored for the customer in the customer database 600.

The parameters of the customer's itinerary and other pertinent restrictions are stored in fields 950 through 995 of the CPO database 900. Specifically, the origin and destination cities are identified in fields 950 and 955, respectively, and any connection restrictions specified by the customer 110 are recorded in field 960. The dates of the customer's departure and return are stored in fields 965 and 970, respectively. In an alternate embodiment (not shown), the CPO database 900 could also permit the customer 110 to specify particular time-of-day (range) restrictions for the departure and return flights.

The CPO database 900 preferably stores an indication of the total number of passengers traveling together in field 975, and sets forth the price the customer is willing to pay per ticket in field 980. Any other miscellaneous restrictions specified by the customer will be recorded in field 985, such as preferred airline(s), flights, or seat assignments. Field 990 records the current status of the respective CPO, such as pending, accepted, rejected or expired. Finally, if the CPO ultimately results in a ticket being booked for the customer, the passenger name record number (PNR) associated with the ticket is stored in field 995. Generally, a PNR is a record stored by the CRS 400 containing information for each ticketed passenger, including: record number, passenger name(s), address for ticketing, billing information, such as credit card number, carrier(s) and flight number(s) for all segments, seat assignments, inventory class, aircraft type, airline-issued authorization code for discounted fare, selling price, and additional comments.

As discussed further below, rather than reject a CPO, one or more airlines may issue a binding counteroffer to the CPO, which the customer 110 may accept or reject. If a counteroffer is issued to a customer 110, then a record of the counteroffer with any associated restrictions, is preferably created in the CPO database 900. For example, if an airline 120 issues a counteroffer to the CPO number 23456 stored in record 905 of the CPO database 900, then the status of the initial CPO is changed to "counter", and a further record (not shown) corresponding to the counteroffer may be stored in the CPO database 900 under a modified CPO number indicating the counteroffer, such as CPO number 23456-CO1.

FIG. 10a illustrates an exemplary secured airline rules database 1000 which preferably maintains the CPO rules for one or more airlines associated with a particular secured airline server 300. As previously indicated, the secured airline rules database 1000 may be stored in an encrypted format to maintain the integrity and confidentiality of the highly sensitive information included in the CPO rules. The secured airline rules database 1000 maintains a plurality of records, such as records 1002 and 1004, each associated with a different CPO rule. For each CPO rule identified by rule number in field 1010, the secured airline rules database 1000 includes the associated restrictions defined by the respective airline in fields 1012 through 1044.

According to a feature of the invention, the CPO rules that are processed by the CPO management system 100 may be of varying complexity. The particular restrictions set forth in the illustrative secured airline rules database 1000 are representative of the principles of the invention only. An airline can incorporate a subset of such restrictions and/or incorporate additional restrictions, as would be apparent to a person of ordinary skill. For example, the CPO rules of an airline 120 may also incorporate restrictions on the minimum number of nights associated with the itinerary, or require the customer 110 to have a Saturday night stay.

For illustrative purposes, the secured airline rules database 1000 shown in FIG. 10a, allows an airline to create CPO rules by specifying some or all of the following restrictions in fields 1012 through 1044: origin and destination cities, connection restrictions, flight numbers included or excluded, dates and times of departure, departure days of the week, dates and times of return, return days of the week, number of passengers traveling, length of haul, average yield per seat, minimum price per ticket, inventory restrictions or seat availability, and advance purchase requirements.

For example, record 1002, shown in FIG. 10a, is associated with a CPO rule for a given airline which specifies that the airline will accept any CPO for travel from Newark, N.J. (EWR) to Orlando, Fla. (MCO) during the month of October, 1997, provided that (i) the customer travels on any flight departing on a Tuesday through Thursday, (ii) the tickets are booked within 21 days of departure, (iii) the price is at least $165 per ticket, (iv) K inventory is available on all flight segments of the customer's itinerary and (v) at least two (2) passengers are travelling together.

Similarly, record 1004, shown in FIG. 10a, is associated with a CPO rule for a given airline which specifies that the airline will accept any CPO having a price of at least $150, for two or more people traveling together between New York, N.Y. (JFK) and Chicago, Ill. (ORD) during April or May, 1997 where Q or K inventory is available on any flight between 11 a.m. and 2 p.m., where the flight departs on a Tuesday and returns on a Monday through Thursday, and is booked between 7 and 21 days prior to travel and can be routed through the airline's Cleveland, Ohio or Pittsburgh, Pa. hubs.

In an alternate or supplemental embodiment, the secured airline rules database 1000 can be implemented using a pair of inventory and pricing databases 1050, 1075, illustrated in FIGS. 10b and 10c, respectively. In this embodiment, the CPO rules stored in the inventory database 1050 contain actual inventory on each flight that the airline has released for sale to CPO customers. The inventory database 1050 maintains a plurality of records, such as records 1052-1056, each associated with a different CPO rule and flight. For each CPO rule identified by rule number in field 1060, the inventory database 1050 includes an indication of the airline, flight number and dates in fields 1062 through 1066, respectively. In addition, the number of seats that may be sold by the CPO management system 100 on each flight is indicated in field 1068. In a preferred embodiment, as inventory is sold by the CPO management system 100, the available inventory recorded in the inventory database 1050 will be decremented.

The pricing database 1075, shown in FIG. 10c, maintains a plurality of records, such as records 1080-1084, each associated with a different O & D Pair. For each O & D Pair identified in fields 1090 and 1092, respectively, the pricing database 1075 includes an indication of the airline, dates and minimum price in fields 1088, 1093 and 1096, respectively.

Thus, in such an alternate or supplemental embodiment, prior to accessing the inventory database 1050, the CPO management system 100 will preferably query the CRS 400 to identify possible flights which satisfy the customer's itinerary restrictions. Thereafter, the CPO management system 100 will access the inventory database 1050 to determine if the airline has released any inventory on such identified flights to the CPO management system 100 for sale to CPO customers. In one embodiment, the list of identified flights from the CRS 400 can be sequenced to optimize customer preferences, and the inventory database 1050 can be searched in the order of the sequenced list of flights, until available inventory is identified. Finally, if any available inventory satisfying the customer's itinerary is identified, then the CPO management system 100 will access the pricing database 1075 shown in FIG. 10c, to determine if the price specified by the customer exceeds the minimum price defined by the airline, as set forth in field 1096 of the pricing database 1075.

FIG. 11 illustrates an exemplary counteroffer rules database 1100 which preferably stores a set of tolerances which may be utilized by the CPO management system 100 to generate a counteroffer to a CPO if the CPO is within predefined tolerances of one or more restrictions associated with a given CPO rule. The counteroffer rules database 1100 maintains a plurality of records, such as records 1105 and 1110, each associated with a different CPO rule. For each CPO rule identified by rule number in field 1120, the counteroffer rules database 1100 includes acceptable tolerances on the dates and times of departure and return in fields 1125 through 1140. In addition, the counteroffer rules database 1100 includes tolerances on the number of passengers traveling, length of haul and yield in fields 1145 through 1155, respectively. Finally, the counteroffer rules database 1100 records any permissible tolerances on the minimum price and advance purchase requirements in fields 1160 and 1165, respectively.

As shown in FIG. 11, the counteroffer rules database 1100 includes counteroffer rule number 45687 in record 1105, corresponding to CPO rule number 45687 from FIG. 10*a*. As illustrated in FIG. 11, the CPO management system 100 is authorized to generate a counteroffer on behalf of an airline 120 associated with CPO rule number 45687, if a given CPO fails to meet one or more of the restrictions of CPO rule number 45687, but the restrictions which are not met are within the predefined tolerances set forth in the counteroffer rules database 1100. For example, if a given CPO includes a customer-defined price of $140.00, but all other airline-defined restrictions of CPO rule number 45687 are met, a counteroffer should be generated containing a price of $150.00 since the price variation is within ten percent (10%) of the minimum price associated with CPO rule number 45687, as authorized by counteroffer rule number 45687.

FIG. 12 illustrates an exemplary secured airline audit database 1200 which preferably maintains an audit trail for each CPO which is processed by the CPO management system 100. The secured airline audit database 1200 maintains a plurality of records, such as records 1205-1215, each associated with a different CPO that has been processed by the CPO management system 100. For each CPO identified by CPO number in field 1220, the secured airline audit database 1200 includes the response of the respective airline to the CPO in field 1225, and the date and time of the CPO in fields 1230 and 1235, respectively. In addition, if a ticket is booked for the customer 110 on any airline, then the secured airline audit database 1200 preferably stores the passenger name record (PNR) number associated with the ticket in field 1240 and an indication of whether or not the ticket was booked on the respective airline in field 1245. In a preferred embodiment, the entry in field 1245 indicates whether the ticket was booked (a) on the respective airline associated with the database, (b) with another airline or (c) if no ticket was issued at all. In this manner, the CPO management system 100 can establish that a ticket was actually booked for each CPO which was accepted by at least one airline.

FIG. 13 illustrates an exemplary pricing and restrictions database 1300 which maintains pricing information and related restrictions for each flight offered by the airlines 120, 130, as established and updated by the RMS 500. The pricing and restrictions database 1300 includes a plurality of records, such as records 1305-1315, each associated with a different flight. For each flight identified by flight number in field 1325, the pricing and restrictions database 1300 includes the date of the flight in field 1330 and the respective price and restrictions associated with each inventory class in fields 1335 through 1350.

FIG. 14 illustrates an exemplary seat allocation database 1400 which maintains available inventory information for each fare class on a given flight offered by the airlines 120, 130, as allocated and updated by the RMS 500. In addition, as inventory is sold by an airline, the airline's ARS 150 will preferably decrement the available inventory recorded in the seat allocation database 1400. The seat allocation database 1400 includes a plurality of records, such as records 1405-1420, each associated with a different flight. For each flight identified by flight number in field 1425, the seat allocation database 1400 includes the departure date of the flight in field 1430 and the respective inventory available in each inventory class in fields 1435 through 1440. In addition, the seat allocation database 1400 preferably includes an indication of the total number of seats booked on the flight in field 1445 and total capacity available on the flight in field 1450.

FIG. 15 illustrates an exemplary forecast and demand analysis database 1500, which records each selling price for each fare class for a given flight, and the forecasted demand at each selling price as established by the RMS 500. As previously indicated, when a flight is first added to the flight schedule of an airline 120, a record of the initial price for each fare class and the forecasted demand is preferably created in the forecast and demand analysis database 1500. In addition, new records are preferably created for each new selling price that is established for each fare class by the RMS 500, as part of the dynamic inventory reallocation process.

The forecast and demand analysis database 1500 includes a plurality of records, such as records 1505-1525, each associated with a different selling price for a given fare class on a given flight. For each flight number identified in field 1530, the forecast and demand analysis database 1500 includes the departure date, and origin and destination cities in fields 1535 through 1545, respectively, and the corresponding offered prices and fare classes in fields 1550 and 1555, respectively. Finally, the forecast and demand analysis database 1500 preferably records the actual quantity of tickets sold by the airline at each offered price for each fare class in field 1560 and the corresponding forecasted quantity in field 1565. The actual quantity of tickets sold may be recorded in field 1560 in real-time as tickets are actually sold or by means of batch processing on a periodic basis.

Processes

Figure 16A:
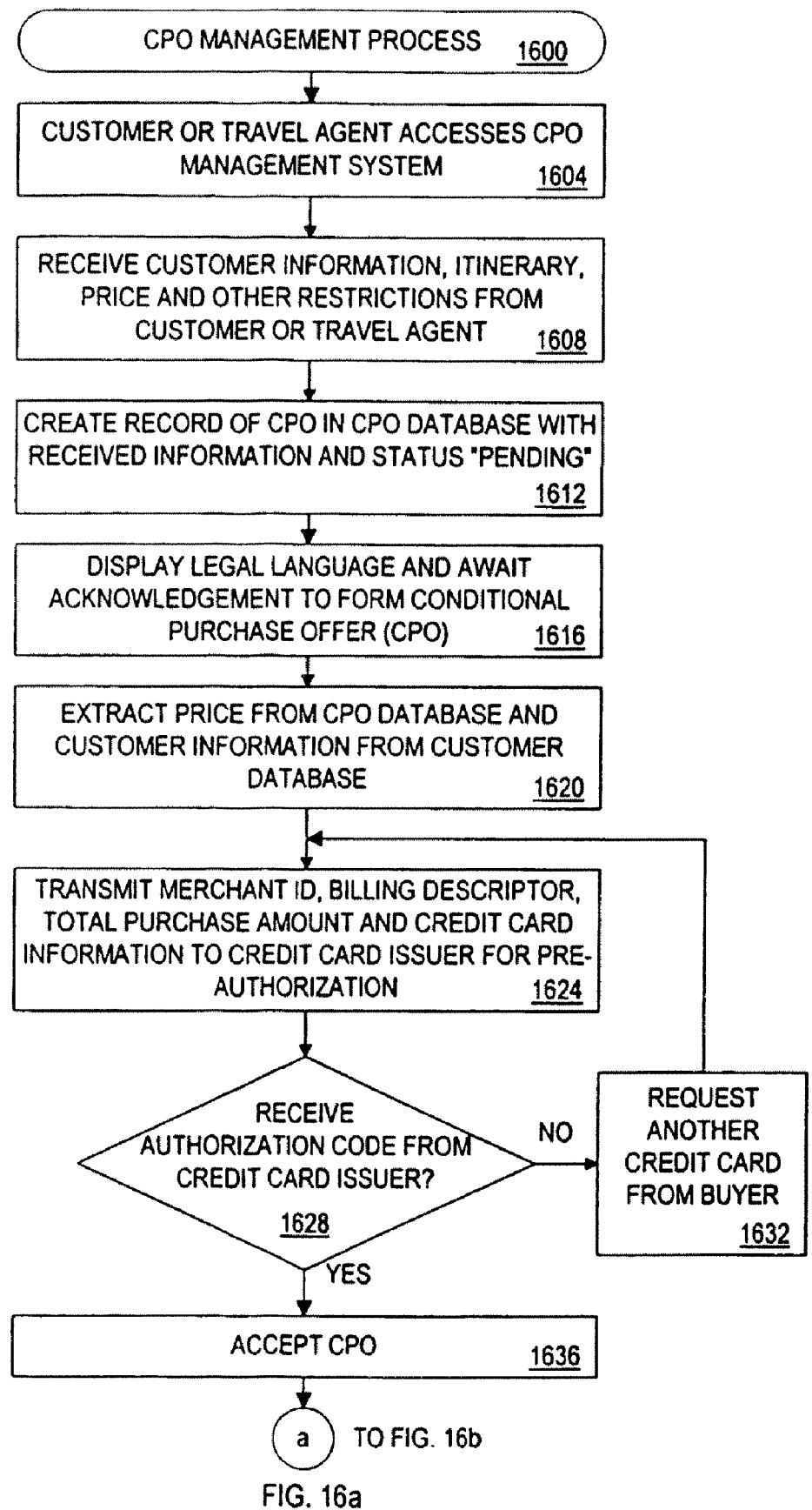
FIGS. 16a through 16c, collectively, are a flow chart describing an exemplary CPO management process implemented by the CPO management central server of FIG. 2.
Figure 16B:
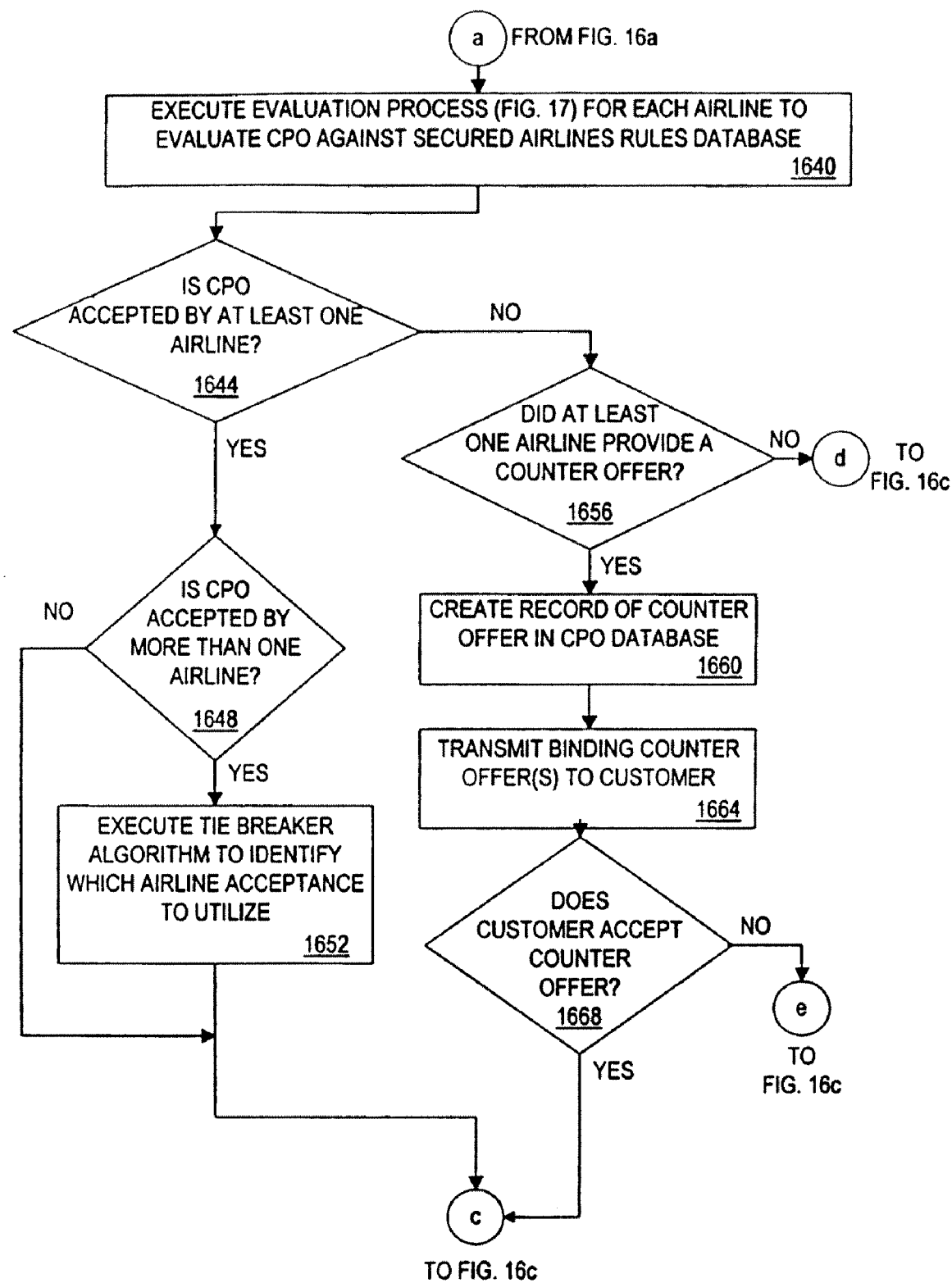
Figure 16C:
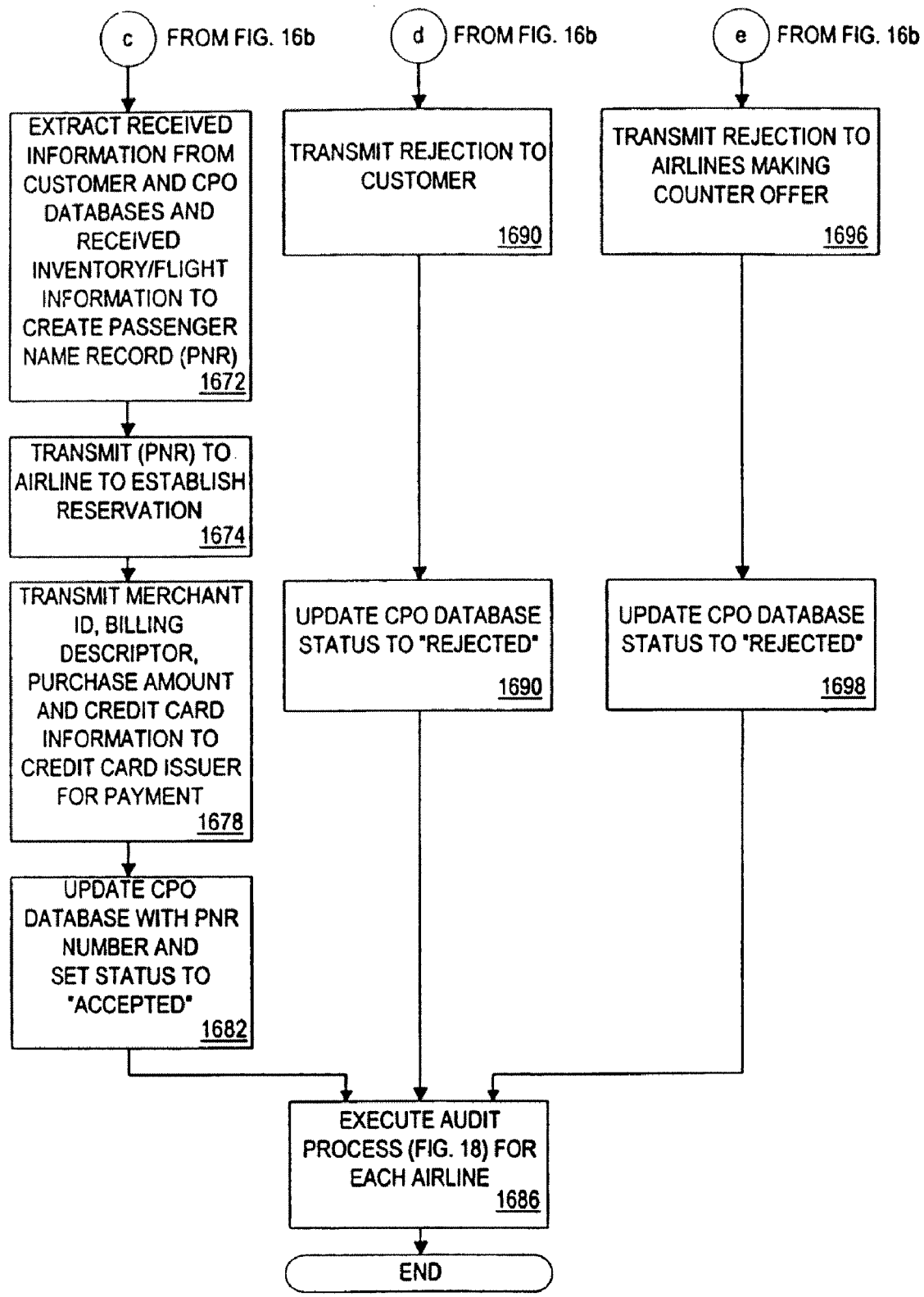

As discussed above, the CPO management central server 200 preferably executes a CPO management process 1600, shown in FIGS. 16*a* through 16*c*, to receive each CPO from a customer 110 and to compare the CPO against the rules of each airline in order to determine whether to accept, reject or counter the CPO on behalf of an airline. As illustrated in FIG. 16*a*, the CPO management process 1600 begins the processes embodying the principles of the present invention during step 1604, when a customer or travel agent accesses the CPO management system 100.

Thereafter, during step 1608, the CPO management central server 200 will receive the customer information, itinerary, price and other restrictions from the customer 110 which are required to populate the customer database 600, if required for a new customer, and the CPO database 900. A record of the CPO is preferably created in the CPO database 900 with the received information during step 1612, and with the status field set to "pending."

Appropriate legal language is preferably displayed or read to the customer 110 during step 1616, and the CPO management system 100 will wait for an acknowledgment from the customer 110 to form a binding conditional purchase offer (CPO). The price is extracted from field 980 of the CPO database 900 and the appropriate customer information, including credit card number, is extracted from the customer database 600 during step 1620. Thereafter, the merchant ID associated with the CPO management system 100, together with an appropriate billing descriptor, the total purchase amount (preferably equal to the price specified by the customer 110) and the credit card information, are transmitted to the credit card issuer during step 1624 for pre-authorization.

A test is then preferably performed during step 1628 to determine if an authorization code has been received from the credit card issuer. If it is determined during step 1628 that the credit card issuer has not authorized the purchase amount, then another credit card is preferably requested from the customer 110 during step 1632 and program control returns to step 1624 to continue processing in the manner described above.

If, however, it is determined during step 1628 that the credit card issuer has authorized the purchase amount, then the CPO is accepted for processing during step 1636 and program control continues to step 1640 (FIG. 16*b*). The CPO management process 1600 preferably executes the evaluation process 1700, discussed below in conjunction with FIG. 17, for each airline during step 1640. The CPO record created during step 1612 is passed to the evaluation process 1700 for comparison against the CPO rules of one airline, such as the airline 120, to generate a response for the airline to the given CPO. As previously indicated, the airline's response to a CPO may be to accept, reject or counter the CPO. As discussed further below, the evaluation process 1700 will return the airline's response to the CPO, as well as a flight number if the CPO is accepted or countered by the airline.

In an alternate embodiment, the evaluation process 1700 can be performed for each airline in a predefined sequence until one airline accepts the CPO. For example, the evaluation process 1700 can be performed in sequence based upon (i) the amount of inventory made available by each airline for sale to CPO customers, (ii) the CPO acceptance rate of each airline, as recorded in the airline database 700, (iii) priorities negotiated by each airline, such as an airline priority over certain routes, or (iv) the highest commission rates paid by the airlines to the CPO management system 100. In this manner, the sequence can be determined by factors that incent participation by the airlines, and/or by factors that optimize revenue to the CPO management system 100. It is noted that in the preferred embodiment, the customer 110 will pay the price defined by the customer if the CPO is accepted by an airline, regardless of the minimum price the airline would be willing to accept or whatever sequencing criteria is utilized by the CPO management system 100 to process the CPO.

As shown in FIG. 16*b*, a test is preferably performed during step 1644 to determine if the CPO was accepted by at least one airline. If it is determined during step 1644 that the CPO was accepted by at least one airline then a further test is preferably performed during step 1648 to determine if the CPO was accepted by more than one airline. If it is determined during step 1648 that the CPO was not accepted by more than one airline then program control proceeds directly to step 1672 (FIG. 16*c*) to book the ticket.

If, however, it is determined during step 1648 that the CPO was accepted by more than one airline, then a tie breaker algorithm is preferably executed during step 1652 to determine which airline acceptance to utilize. For example, the tie breaker algorithm can select an airline offering an itinerary which maximizes the convenience to the customer 110, maximizes the profit to the CPO management system 100 or optimizes the inventory available for sale by the CPO management system 100. It is noted that in the alternate embodiment, where the evaluation process 1700 is performed for each airlines in a predefined sequence until one airline accepts the CPO, a tie breaker algorithm will not be required. In a further alternate embodiment, the customer 110 may select for himself which airline acceptance to utilize. Thereafter, program control proceeds to step 1672 (FIG. 16*c*) to book the ticket.

In order to book the ticket, the information required to create a passenger name record (PNR) is extracted from the customer database 600, the CPO database 900 and the inventory and flight information received from the evaluation process 1700 or CRS 400. As previously indicated, a PNR generally includes the following parameters: record number, passenger name(s), address for ticketing, billing information, such as credit card number, flight number(s) for all segments, carrier(s), seat assignments, inventory class, aircraft type, airline-issued authorization code for discounted fare, selling price, and additional comments.

Thereafter, during step 1674, the PNR is transmitted to the airline reservation system 150 of the airline upon which the ticket will be booked or the CRS 400 to establish a reservation. The CPO management process 1600 will then transmit the merchant ID associated with the CPO management system 100, together with an appropriate billing descriptor, the total purchase amount (preferably equal to the price specified by the customer 110) and the credit card information, to the credit card issuer during step 1678 for payment.

Figure 18:
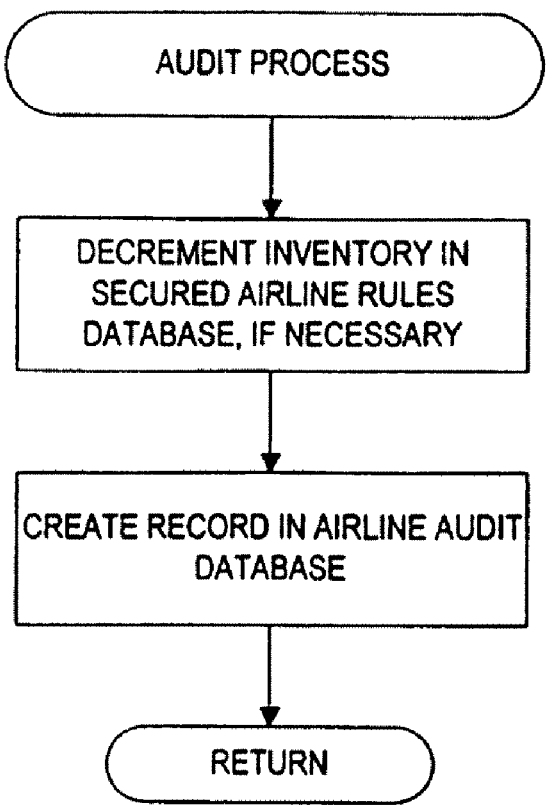
FIG. 18 is a flow chart describing an exemplary audit process implemented by the secured airline server of FIG. 3.

The record of the CPO in the CPO database 900 is updated during step 1682 with the assigned PNR number and the status field is changed to "accepted." Finally, an audit process 1800, discussed below in conjunction with FIG. 18, is executed by the CPO management process 1600 during step 1686 for each airline to maintain an audit trail for each CPO which is processed by the CPO management system 100. As previously indicated, the audit process 1800 will create an entry in the secured airline audit database 1200 which can be utilized to establish that a ticket was actually booked by the CPO management system 100 for each CPO which was accepted by at least one airline.

If, however, it was determined during step 1644 (FIG. 16*b*) that the CPO was not accepted by at least one airline, then a further test is performed during step 1656 to determine if at least one airline provided a counteroffer to the CPO. If it is determined during step 1656 that at least one airline did provide a counteroffer to the CPO, then the status of the initial CPO is changed to "counter", and a record of the counteroffer is preferably created in the CPO database 900 during step 1660, for example using the original CPO number with a "-CO" extension. Thereafter, the counteroffer(s) are transmitted to the customer 110 during step 1664. In an alternate embodiment, if the CPO is within predefined tolerances, rather than receiving one or more counteroffers, the customer 110 can be instructed to resubmit the CPO at a later time, or the CPO management system 100 can periodically reexecute the CPO until the CPO is accepted or until the CPO expires. It is noted that in view of the dynamic nature of the CPO rules, a CPO which is initially rejected may be subsequently accepted by one or more airlines.

A test is then preferably performed during step 1668 to determine if the customer 110 accepted one of the counteroffer(s). If it is determined during step 1668 that the customer 110 did accept a counteroffer, then program control proceeds to step 1672 (FIG. 16*c*) to book the ticket, in the manner described above. If, however, it is determined during step 1668 that the customer 110 did not accept a counteroffer, then program control proceeds to step 1696 (FIG. 16c), where the CPO management process 1600 will transmit the customer's rejection of the counteroffer to the airline(s) making the counteroffer. Thereafter, during step 1698, the CPO management process 1600 will update the status of the counteroffer associated with the CPO in the CPO database 900 to "rejected." Program control proceeds to step 1686 in the manner described above and then terminates during step 1699.

If, however, it was determined during step 1656 (FIG. 16b) that no airlines provided a counteroffer to the CPO, then program control proceeds to step 1690 (FIG. 16c), where the CPO management process 1600 will transmit the rejection of the CPO to the customer 110. Thereafter, the status of the CPO in the CPO database 900 is updated to "rejected" during step 1694. Program control proceeds to step 1686 in the manner described above and then terminates during step 1699.

Figure 17A:
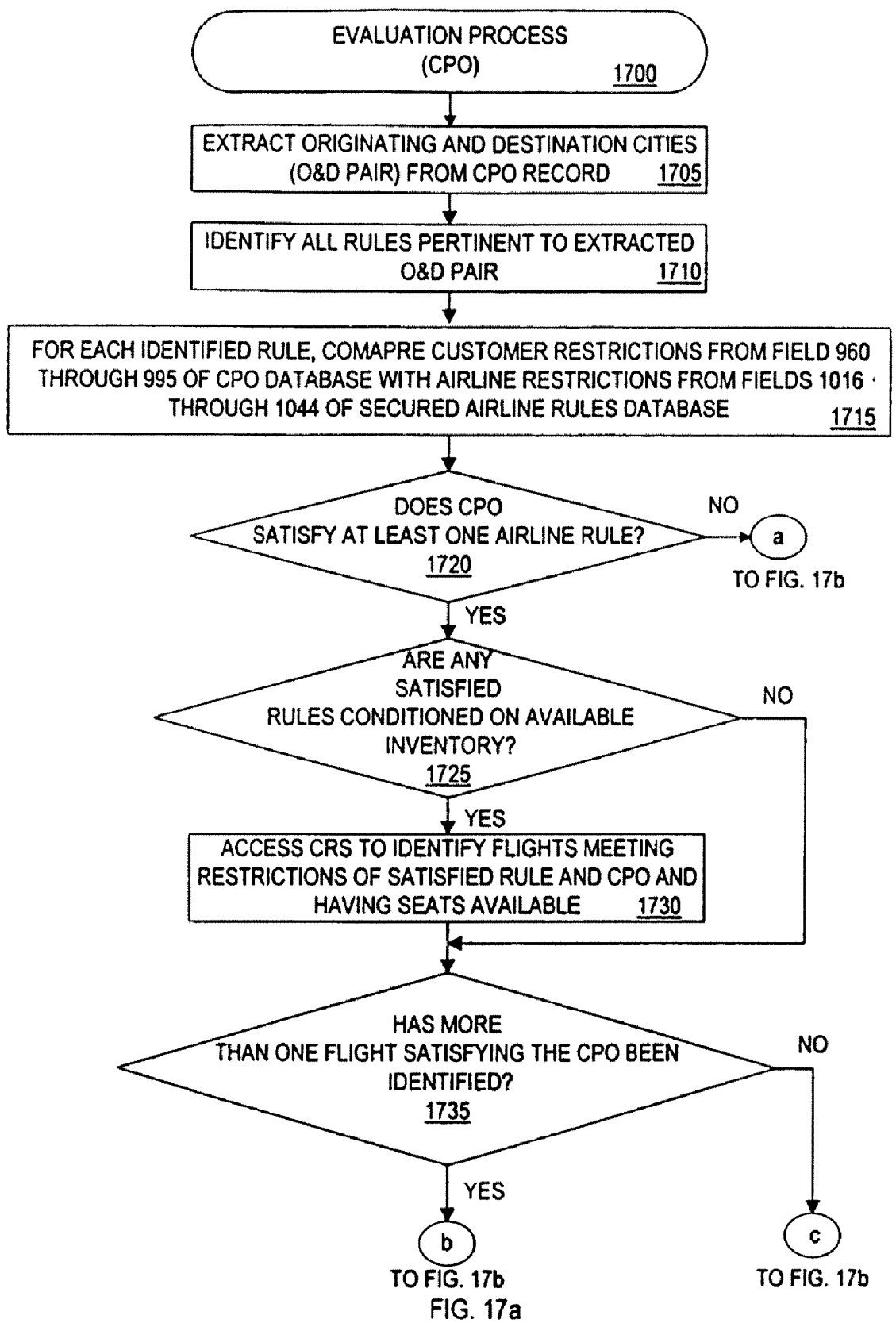
FIGS. 17a and 17b, collectively, are a flowchart describing an exemplary evaluation process implemented by the secured airline server of FIG. 3.
Figure 17B:
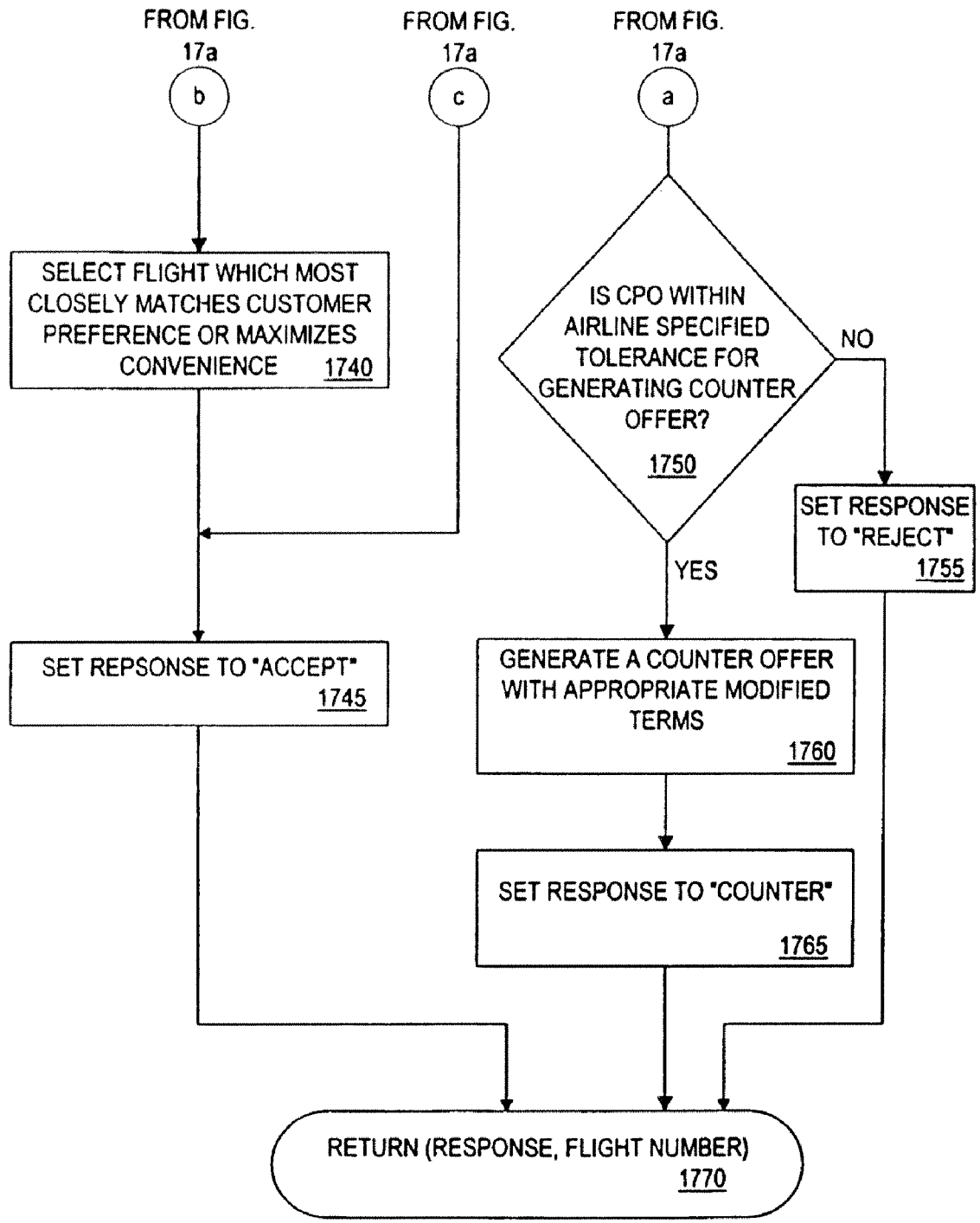

As discussed above, the CPO management process 1600 executes an evaluation process 1700, during step 1640. An exemplary evaluation process 1700 is shown in FIGS. 17a and 17b. In one embodiment, the evaluation process 1700 is preferably customized for each airline, so that each evaluation process 1700 receives the CPO record from the CPO management process 1600 in a standard format for comparison against the rules of the associated airline, such as the airline 120, and returns a standard response of the airline to the CPO, such as accept, reject or counter. In addition, if the response of the airline is to accept or counter the CPO, the evaluation process 1700 preferably also returns the selected flight number.

As shown in FIG. 17a, the evaluation process 1700 initially extracts the O & D Pair from the CPO record during step 1705 and thereafter identifies all CPO rules in the secured airline rules database 1000 which are pertinent to the extracted O & D Pair during step 1710. The customer defined restrictions from fields 960 through 995 of the CPO record are then compared to the corresponding airline defined restrictions from fields 1016 through 1044 of the secured airline rules database 1000 during step 1715, for each CPO rule identified during the previous step.

Thereafter, a test is performed during step 1720 to determine if the CPO satisfies at least one airline rule. For example, CPO number 23452, stored in record 910 of the CPO database 900 (FIGS. 9a and 9b), defines an O & D Pair of New York (JFK) to Chicago (ORD). Thus, the evaluation process 1700 will access the secured airline rules database 1000 and identify all CPO rules for this O & D Pair. In the illustrative secured airline rules database 1000 shown in FIG. 10a, CPO rule number 23452 is identified as the only rule pertinent to this O & D Pair. Thereafter, each of the customer defined restrictions from fields 960 through 995 of the CPO number 23452 are compared to the corresponding airline defined restrictions from fields 1016 through 1044 of CPO rule number 23452. Since the customer is willing to make one stop (field 960), the airline requirement of routing through Cleveland or Pittsburgh (field 1016) can be satisfied. In addition, the customer's dates of departure and return requirements (fields 965 and 970) satisfy the airline's dates, times and day of week requirements for both the departure and return legs of the trip (fields 1020 through 1032). In addition, the number of passengers traveling satisfies the airline requirement set forth in field 1034 and the customer's price (field 980) exceeds the airline's defined minimum price (field 1040). Thus, CPO number 23452 will be accepted by the airline associated with CPO rule number 45687, provided that Q or K inventory is available (field 1042) and the CPO is being processed between 7 and 21 days prior to flight (field 1044).

In one embodiment, the CPO management system 100 allows the airlines 120, 130 to specify CPO rules in a format that accepts a given CPO, conditioned upon the CPO management system 100 finding inventory available that meets the requirements of the airline, as set forth in the CPO rule, and the requirements of the customer 110, as set forth in the CPO itself. For example, CPO rule number 23452, shown in FIG. 10a, is conditioned upon Q or K inventory being available.

Thus, if it is determined during step 1720 that the CPO satisfies at least one airline rule, then a further test is preferably performed during step 1725 to determine if any of the satisfied rules are conditioned on inventory being available.

If it is determined during step 1725 that none of the satisfied rules are conditioned on inventory being available, then program control proceeds directly to step 1735, discussed below. If, however, it is determined during step 1725 that one or more satisfied rules are conditioned on inventory being available, then the CRS or ARS is accessed during step 1730 to identify flights, if any, with seats available and meeting the appropriate restrictions of both the satisfied CPO rule and the CPO.

Thereafter, a test is performed during step 1735 to determine if more than one flight satisfying the CPO has been identified. If it is determined during step 1735 that only one satisfactory flight has been identified, then program control proceeds directly to step 1745 (FIG. 17b), discussed below.

If, however, it is determined during step 1735 that more than one satisfactory flight has been identified, then one flight is selected during step 1740 (FIG. 17b) which most closely matches the customer preferences set forth in the CPO or maximizes the convenience for the customer. Alternatively, each airline 120 can define its own criteria for the CPO management system 100 to utilize to select a single flight. Thereafter, the response will be set to "accept" during step 1745, and program control will return to the CPO management process 1600 during step 1770 with the defined response and selected flight number.

If, however, it was determined during step 1720 (FIG. 17a) that the CPO does not satisfy at least one airline rule, then program control proceeds to step 1750 (FIG. 17b), where a further test is performed to determine if the CPO is within tolerances specified by the airline for generating a counteroffer. As previously indicated, the counteroffer rules database 1100 is preferably stored by each secured airline server 300 to maintain a set of tolerances which may be utilized by the CPO management system 100 to generate a counteroffer to a CPO on behalf of an airline, if the CPO is within predefined tolerances of one or more restrictions associated with a given CPO rule.

Thus, if it is determined during step 1750 that the CPO is within tolerances specified by the airline for generating a counteroffer, then a counteroffer is generated during step 1760 with the appropriate modified terms, as retrieved from the counteroffer rules database 1100. Thereafter, the response will be set to "counter" during step 1765, and program control will return to the CPO management process 1600 during step 1770 with the defined response and selected flight number.

If, however, it is determined during step 1750 that the CPO is not within tolerances specified by the airline for generating a counteroffer, then the response will be set to "rejected" during step 1755, and program control will return to the CPO management process 1600 during step 1770 with the defined response and the selected flight number equal to null.

As previously indicated, the CPO management process 1600 preferably executes an audit process 1800 during step 1686 for each airline to maintain an audit trail for each CPO that is processed by the CPO management system 100. An exemplary audit process 1800 is shown in FIG. 18. The audit process 1800 will preferably create an entry in the secured airline audit database 1200 which can be utilized by the CPO management system 100 to establish that a ticket was actually booked by the CPO management system 100 for each CPO which was accepted by at least one airline. In this manner, the airlines 120 can be assured that the risk of a customer 110, another airline 130 or a third party utilizing the CPO management system 100 to obtain the underlying price flexibility of the airline 120 is minimized.

As shown in FIG. 18, the audit process 1800 will initially decrement the inventory in the secured airline rules database, if necessary, during step 1810. For example, inventory should be decremented only if the ticket was ultimately booked by the associated airline, and the CPO rule which was utilized to accept the CPO actually included inventory released by the airline for sale to CPO customers, as opposed to a CPO rule which was conditioned upon inventory being available.

Thereafter, the audit process 1800 preferably creates a record of the CPO in the secured airline audit database 1200, including the CPO number, the PNR associated with the ticket issued by the CPO management system 100, if any, to the customer 110, and an indication of whether the ticket, if any, was booked on the corresponding airline. Program control will then return to the CPO management process 1600 during step 1820.

Figure 19:
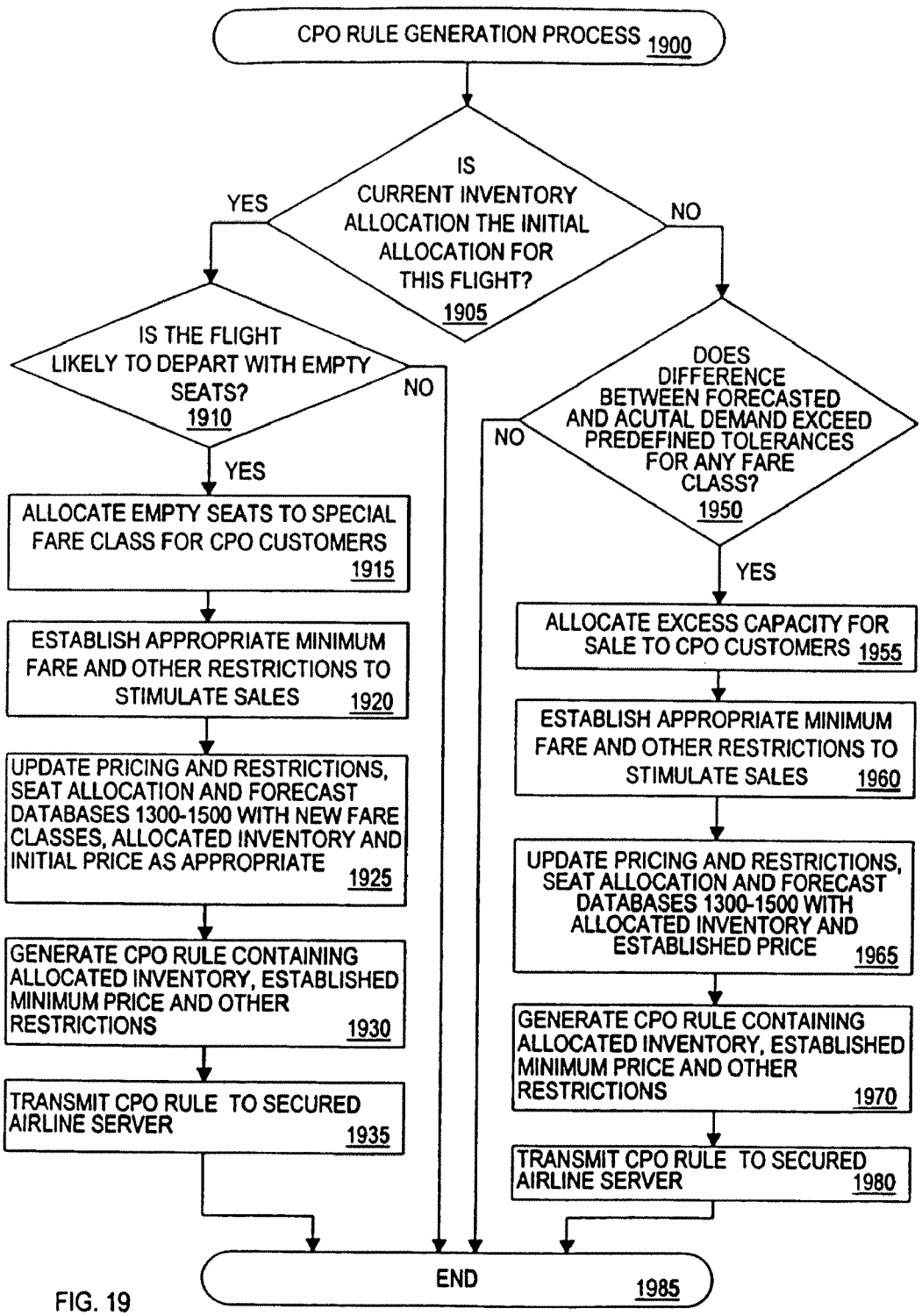

An illustrative CPO rules generation process 1900, shown in FIG. 19, is preferably executed by the RMS 500 initially when a flight is first added to the flight schedule, and then periodically to reallocate and price available inventory in response to demand and external events. Thus, a test is initially performed during step 1905 to determine if the current inventory allocation by the RMS 500 is the initial allocation for the flight being allocated. If it is determined during step 1905 that the current inventory allocation is the initial allocation for the flight being allocated, then a further test is performed during step 1910 to determine if the flight is predicted, using conventional methods, to likely depart with empty seats.

If it is determined during step 1910 that the flight is not likely to depart with empty seats, then program control will terminate during step 1985. If, however, it is determined during step 1910 that the flight is likely to depart with empty seats, then the CPO rule generation process 1900 will preferably allocate the empty seats to a special fare class for CPO customers during step 1915. Thereafter, an appropriate minimum fare and other restrictions for such tickets will be established during step 1920.

The pricing and restrictions database 1300, seat allocation database 1400, and forecast and demand analysis database 1500 for the flight will be updated during step 1925 with the newly established fare class, the allocated inventory and the initial price. Thereafter, the CPO rules generation process 1900 will preferably generate a CPO rule containing the allocated inventory, established minimum price and other restrictions during step 1930 and then transmit the generated CPO rule to the associated secured airline server 300 during step 1935. Program control will then terminate during step 1985.

If, however, it was determined during step 1905 that the current inventory allocation is not the initial allocation for the flight being allocated, then program control proceeds to step 1950 to reallocate a previous allocation for one or more fare classes of a given flight in order to minimize the unanticipated excess inventory delta 580. Thus, a test is performed during step 1950 to determine if the forecasted demand exceeds the actual demand by more than a predefined tolerance for any fare class. In one embodiment, the RMS can make this determination utilizing the summary information recorded in fields 1560 and 1565 of the forecast and demand analysis database 1500. In addition, the RMS 500 can generate the predefined tolerance utilized in step 1950 by analyzing historical demand information stored in the forecast and demand analysis database 1500 for prior periods.

If it is determined during step 1950 that the forecasted demand does not exceed the actual demand by more than a predefined tolerance for any fare class, then there is no need to reallocate the existing allocation and program control will terminate during step 1985. It is noted that if actual demand exceeds forecasted demand, the RMS 500 can remove inventory that was previously allocated for sale to CPO customers.

If, however, it is determined during step 1950 that the forecasted demand does exceed the actual demand by more than a predefined tolerance for any fare class, then the RMS 500 will preferably allocate the excess capacity, or a portion thereof, for sale to CPO customers during step 1955. Thereafter, an appropriate minimum fare and other restrictions for such tickets will be established during step 1960.

The pricing and restrictions database 1300, seat allocation database 1400, and forecast and demand analysis database 1500 for the flight will be updated during step 1965 with the reallocated inventory and the established price. Thereafter, the CPO rules generation process 1900 will generate a CPO rule containing the allocated inventory, established minimum price and other restrictions during step 1970 and then transmit the generated CPO rule to the associated secured airline server 300 during step 1980. Program control will then terminate during step 1985.

It is to be understood that the embodiments and variations shown and described herein are merely illustrative of the principles of this invention and that various modifications may be implemented by those skilled in the art without departing from the scope and spirit of the invention.

For example, as previously indicated, although the present invention has been illustrated in an airline environment, the CPO management system 100 could be utilized to sell any item, as would be apparent to a person of ordinary skill.

We claim:

1. A method of processing airline tickets, comprising the steps of:
   obtaining a purchase offer for travel from a customer, said purchase offer containing at least one customer-defined condition including a price;
   identifying one or more rules from a plurality of sellers of airline tickets, each of said rules containing one or more airline-defined restrictions; and
   comparing said purchase offer to said rules to determine whether any of said sellers of airline tickets is willing to accept said purchase offer if said customer-defined conditions satisfy said airline-defined restrictions.

2. An apparatus for processing airline tickets, comprising:
   a memory;
   a memory processor disposed in communication with the memory and configured to issue a plurality of processing instructions stored in the memory, wherein the processor issues instructions to:
   obtain a purchase offer for travel from a customer, said purchase offer containing at least one customer-defined condition including a price;

identify one or more rules from a plurality of sellers of airline tickets, each of said rules containing one or more airline-defined restrictions; and compare said purchase offer to said rules to determine whether any of said sellers of airline tickets is willing to accept said purchase offer if said customer-defined conditions satisfy said airline-defined restrictions.

3. A non-transitory medium for processing airline tickets, comprising:

a plurality of processing instructions stored in the medium and issuable by a processor to:

obtain a purchase offer for travel from a customer, said purchase offer containing at least one customer-defined condition including a price;

identify one or more rules from a plurality of sellers of airline tickets, each of said rules containing one or more airline-defined restrictions; and compare said purchase offer to said rules to determine whether any of said sellers of airline tickets is willing to accept said purchase offer if said customer-defined conditions satisfy said airline-defined restrictions.

4. The method of claim 1, further comprising:

receiving a payment identifier specifying at least one financial account for providing guaranteed payment if said purchase offer is acceptable.

5. The method of claim 1, wherein said purchase offer further includes an expiration date.

6. The method of claim 1, wherein said rules include airline inventory and pricing information.

7. The method of claim 1, wherein said rules are stored in an airline reservation system.

8. The method of claim 1, further comprising:

pre-authorizing said price with a financial clearinghouse.

9. The method of claim 1, further comprising:

authenticating said purchase offer prior; and wherein comparing said purchase offer to said rules only occurs if said purchase offer is successfully authenticated.

10. The method of claim 1, further comprising:

transmitting a rejection of said purchase offer to the customer if said customer-defined conditions fail to satisfy said airline-defined restrictions.

11. The method of claim 1, further comprising:

binding said customer to fulfill the purchase offer if said customer-defined conditions satisfy said airline-defined restrictions.

12. The method of claim 4, wherein said financial account is a debit account.

13. The method of claim 4, wherein said financial account is a credit account.

14. The method of claim 4, further comprising:

charging said financial account at said price if at least one of said sellers of airline tickets is willing to accept said purchase offer.

15. The method of claim 9, wherein the authenticating comprises acceptance of a customer credit card number.

16. The method of claim 10, further comprising:

performing a deterrence action to deter the customer from submitting additional purchase offers related to the purchase offer.

17. The method of claim 10, further comprising:

generating a counteroffer; and transmitting said counteroffer to said customer.

18. The method of claim 16, wherein the deterrence action comprises limiting additional purchase offers containing a progressively increasing price.

19. The method of claim 16, wherein the deterrence action comprises limiting additional purchase offers that the customer is able to submit within a predefined period of time.

20. The method of claim 17, wherein generating and transmitting only occur if said price is within a predefined tolerance of at least one of said rules.

* * * * *